(12) United States Patent
Seno et al.

(10) Patent No.: US 10,797,817 B2
(45) Date of Patent: Oct. 6, 2020

(54) OPTICAL SIGNAL PROCESSING DEVICE

(71) Applicant: Nippon Telegraph and Telephone Corporation, Tokyo (JP)

(72) Inventors: Kazunori Seno, Musashino (JP); Kenya Suzuki, Atsugi (JP); Mitsumasa Nakajima, Atsugi (JP); Keita Yamaguchi, Atsugi (JP); Masashi Miyata, Atsugi (JP); Takashi Goh, Atsugi (JP); Toshikazu Hashimoto, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/473,206

(22) PCT Filed: Dec. 25, 2017

(86) PCT No.: PCT/JP2017/046291
§ 371 (c)(1),
(2) Date: Jun. 24, 2019

(87) PCT Pub. No.: WO2018/123921
PCT Pub. Date: Jul. 5, 2018

(65) Prior Publication Data
US 2019/0349112 A1 Nov. 14, 2019

(30) Foreign Application Priority Data

Dec. 28, 2016 (JP) ................................ 2016-256265
May 18, 2017 (JP) ................................ 2017-099309

(51) Int. Cl.
*H04J 14/02* (2006.01)
*G02F 1/31* (2006.01)

(52) U.S. Cl.
CPC ............ *H04J 14/0212* (2013.01); *G02F 1/31* (2013.01); *G02F 2203/12* (2013.01); *G02F 2203/50* (2013.01)

(58) Field of Classification Search
CPC .............. H04J 14/0212; G02F 2203/50; G02F 2203/12; G02F 1/31
See application file for complete search history.

(56) References Cited

U.S. PATENT DOCUMENTS

2002/0131685 A1* 9/2002 He ..................... G02B 6/12007
385/24
2004/0008401 A1 1/2004 Szezepanek et al.
(Continued)

FOREIGN PATENT DOCUMENTS

CN 103197388 A 7/2013
JP H11-223736 A 8/1999
(Continued)

OTHER PUBLICATIONS

Japanese Office Action dated Jan. 7, 2020, issued in Japanese Application No. 2018-559430.
(Continued)

*Primary Examiner* — Dzung D Tran
(74) *Attorney, Agent, or Firm* — Workman Nydegger

(57) ABSTRACT

Provided is an optical signal processing device that can operate simultaneously for a plurality of wavelength bands. The optical signal processing device includes a WDM coupler array including a plurality of WDM couplers for separating the C band and the L band for the respective ports; input/output port groups provided for the C band and the L band, respectively; a micro lens array; a diffraction grating; a lens; and a spatial light modulator arranged in this order. The spatial light modulator collects light at different positions for the respective wavelengths, thus allowing all wavelengths to be independently subjected to a phase modu-
(Continued)

lation. Light subjected to the desired phase modulation by the spatial light modulator is reflected and is deflected to have an angle corresponding to any desired port of the input/output port group, and then is optically-coupled to an input/output port depending on the deflection angle.

11 Claims, 31 Drawing Sheets

(56) References Cited

U.S. PATENT DOCUMENTS

| | | | | |
|---|---|---|---|---|
| 2009/0304328 | A1* | 12/2009 | Presley | G02B 6/29311 385/16 |
| 2010/0040380 | A1 | 2/2010 | Lewin et al. | |
| 2011/0243491 | A1* | 10/2011 | Hashimoto | G02F 1/035 385/3 |
| 2012/0087667 | A1* | 4/2012 | Bulthuis | G02B 6/12016 398/79 |
| 2018/0278359 | A1* | 9/2018 | Robertson | H04J 14/021 |

FOREIGN PATENT DOCUMENTS

| | | |
|---|---|---|
| JP | 2000-111751 A | 4/2000 |
| JP | 2007148429 A | 6/2007 |
| JP | 2007228627 A | 9/2007 |

OTHER PUBLICATIONS

International Search Report dated Mar. 20, 2018, issued in PCT Application No. PCT/JP2017/046291, filed Dec. 25, 2017.

International Preliminary Report on Patentability dated Jul. 11, 2019, issued in PCT Application PCT/JP2017/046291, filed Dec. 25, 2017.

C. Doerr et al., *O, E, S, C, and L Band Silicon Photonics Coherent Modulator/Receiver*, Th5C.4, OFC Post Deadline Papers, Mar. 20, 2016, pp. 3.

S. Okamoto et al., *5-Band (O, E, S, C, and L) WDM Transmission with Wavelength Adaptive Modulation Format Allocation*, Th.2.P2.SC5.4, $42^{nd}$ European Conference and Exhibition on Optical Communications, Sep. 18, 2016, pp. 1172-1174.

N. Ooba et al., *Compact Wide-Band Wavelength Blocker Utilizing Novel Hybrid AWG-Free Space Focusing Optics*, Conference on Optical Fiber Communication/National fiber Optic Engineers Conference 2008, Feb. 24, 2008, QWI2, pp. 3.

* cited by examiner

OPTICAL SIGNAL PROCESSING DEVICE

TECHNICAL FIELD

The present invention relates to an optical signal processing device achieving an ultrawideband operation to contribute to an optical transmission system having a higher capacity.

BACKGROUND ART

With the rapidly-increasing needs for optical communication networks having a higher capacity, transparent network systems such as ROADM (Reconfigurable Optical Add/Drop Multiplexer) have been widely used that directly perform a signal processing on an optical signal without using an electric switching. This system is advantageous from the viewpoints such as a communication speed, power consumption, and a signal processing load at a node and has been increasingly important.

FIG. 1 illustrates a configuration example of a conventional ROADM system. The ROADM node in this configuration example is composed of: an optical amplitude amplification function part group 101 for amplifying the signal light from a preceding stage node for each path; a wavelength selection function part group 102; a wavelength selection function part group 107; and an optical amplitude amplification function part group 108 for amplifying an optical signal prior to being transmitted to a subsequent stage node. The wavelength selection function part group 102 switches a signal from each path on the basis of a wavelength unit via a wavelength demultiplexing function part group 103 and a receiver group 104 connected to a desired subsequent stage node or provided in the node thereof so that an optical signal having a desired wavelength is received by a desired receiver (Drop). The wavelength selection function part group 107 switches an optical signal on the basis of a wavelength unit so that an optical signal having a desired wavelength is transmitted (Add) to a desired path via the wavelength selection function part group 102 or a transmitter group 105 and a wavelength multiplexing function part group 106.

Each function part group entirely performs relaying and switching operations in an optical manner. Thus, an optical signal can be directly communicated without being converted to an electric signal. Among such groups, the optical amplitude amplification function part groups 101 and 108 include optical amplification components such as devices including an erbium-doped optical fiber amplifier (EDFA) and a fiber raman amplifier. Such groups also frequently include, for the purpose of providing a stable communication, devices such as a gain equalizer (GE) for providing uniform and flat gain spectra of the respective amplifiers and an optical channel monitor (OCM) for monitoring the strength of each wavelength. The wavelength selection function part groups 102 and 107 as well as the wavelength demultiplexing function part group 103 and the wavelength multiplexing function part group 106 include, in addition to the above-described devices, flexible switching devices for selecting a wavelength and a path such as an arrayed-waveguide grating (AWG), a wavelength selection switch (WSS), a transponder aggregator (TPA), and a multicast switch (MCS) for example. As described above, one ROADM node may be considered as being composed of many various devices.

The ROADM system as described above has been required to satisfy the needs for a further-higher capacity. Such higher capacities are provided by methods typically including a wavelength division multiplexing (WDM) communication technique, an improved transmission rate by an innovated modulation method, and a polarization multiplexing communication technique for multiplexing two orthogonal polarised waves for example. However, the development has been slowing down for such a technique that achieves a higher capacity while maintaining a long-distance transmission characteristic similar to the conventional design. Thus, a technique has been long desired that can dramatically improve the transmission capacity.

In the situation as described above, attention has been paid in recent years on such a technique that uses a wider wavelength band for optical communication than the conventional case. The conventional optical communication frequently uses bands such as an O band (1260-1360 nm), an E band (1360-1460 nm), an S band (1460-1530 nm), a C band (1530-1565 nm), and an L band (1565-1625 nm). The most-frequently-used bands include in particular the C band having the highest light transmittance in single mode optical fibers or the L band closest to the zero dispersion wavelength in wavelength dispersion shift fibers. Thus, today's optical communication networks are configured mainly by the use of these wavelength bands.

What is remarkable is that a wavelength band used in one fiber is only one wavelength band among a plurality of wavelength bands as described above. This can be considered as a significant possibility where a plurality of wavelength bands are simultaneously applied to one communication system to thereby allow one optical fiber to have an increased transmission capacity (Non Patent Literature 1 and 2).

In order to realize the method as described above, a method as shown in FIG. 2 for example has been suggested. FIG. 2 illustrates a configuration example of a conventional wavelength band-expanded ROADM node. A system will be illustratively described in which the C band and the L band are both applied to one fiber. A wavelength band demultiplexing function part 201 outputs the wavelength bands of the C band and the L band to separate fibers, respectively, among which the fiber receiving a C band optical signal is connected to a C band ROADM node 202 that operates only based on the C band among those of the ROADM node in FIG. 1 and a fiber receiving an L band optical signal is connected to an L band ROADM node 203 similarly that operates based on the L band. Finally, a wavelength band multiplexing function part 204 is provided to multiplex the respective wavelength bands to one fiber. By configuring the system as described above, two wavelength bands can be simultaneously used in a node and one optical fiber connected to the node, thus approximately doubling the accommodation efficiency.

FIG. 2 illustrates the system having the C band and the L band only for a description purpose. However, this method is not limited to the C band and the L band and also can be applied to an arrangement in which the respective wavelength bands including the above typical examples are provided in parallel. In this manner, the wavelength resource can be used more efficiently, thus achieving a dramatically-increased capacity.

CITATION LIST

Non Patent Literature

NPL 1—C. Doerr et al., "O, E, S, C, and L Band Silicon Photonics Coherent Modulator/Receiver," Th5C.4, OFC 2016, (2016).

NPL 2—S. Okamoto et al., "5-band (O, E, S, C, and L) WDM Transmission with Wavelength Adaptive Modulation Format Allocation," Th.2.P2.SC5.4, ECOC 2016, (2016).

SUMMARY OF INVENTION

Technical Problem

However, in the case of the configuration shown in FIG. 2 for realizing a higher capacity, a function part that can be shared among the C band and the L band is the wavelength band demultiplexing function part 201 and the wavelength band multiplexing function part 204. Thus, a disadvantage is found that group used for the C band ROADM node 202 and the L band ROADM node 203 other than them (e.g., devices for realizing the respective function part groups shown in FIG. 1) must be all individually prepared for the C band and the L band, respectively.

Thus, although a higher capacity can be realized, the system setting cost is two times or more higher than that of the conventional case. This cost not only includes CAPEX (Capital expenditure) as a simple cost to purchase the device but also includes OPEX (Operational expenditure) required for the operation including the costs for electric power, operation space, and maintenance for example. In addition, the doubled number of required devices results in a doubled failure rate, which causes a declined operating ratio of the entire network system. This is very disadvantageous also from the viewpoint of the network reliability.

In view of the above, in order to realize this system, a device providing an ultrawideband operation is strongly desired that prevents the need for a simply-doubled system by allowing each function part group to handle a plurality of wavelength bands. In addition, the device providing an ultrawideband operation as described above is also required to achieve an optical characteristic similar to that required for a device handling only one wavelength band. For example, the WSS has basic characteristics including a transmission bandwidth. However, if the handling of a plurality of wavelength bands undesirably causes a half transmission bandwidth, the transmission capacity per one wavelength bandwidth is undesirably reduced, thus preventing an improved accommodation efficiency from being achieved. Thus, the characteristic and function required for a device handling only one wavelength band also must be achieved by a device providing an ultrawideband operation.

Thus, it is an objective of the present invention to provide an optical signal processing device that has wavelength demultiplexing means individually designed for the respective wavelength bands typically including the C band the L band and that includes optical elements such as a spatial light modulator commonly shared by the respective wavelength bands and an optical element such as a lens. By providing such an optical signal processing device, the device has an optical characteristic required for a device that can simultaneously operate for a plurality of wavelength bands and that handles only one wavelength band.

Solution to Problem

In order to solve the above problem, one embodiment of the present invention provides an optical signal processing device, includes: M (M≥1) wavelength band separation means for separating optical signals for N(N≥2) wavelength bands having no mutually-overlapping wavelength ranges to output the optical signals for the respective wavelength bands, respectively; a wavelength demultiplexing means for providing the optical signals for the respective wavelength bands separated by the M wavelength band separation means with different wavelength demultiplexing statuses in a free space, respectively; a light collecting means for light-collecting the wavelength-demultiplexed optical signal for each of the wavelength bands; and one spatial light modulator for phase-modulating the optical signals light-collected in N regions by the light collecting means, respectively.

According to another embodiment of the present invention, among the optical signals light-collected in the N regions for the respective wavelength bands, two or more optical signals having a reference wavelength of the wavelength band have the same light collecting position at the wavelength demultiplexing axis of the wavelength demultiplexing means.

According to another embodiment of the present invention, the optical signal processing device further includes at least M input/output port groups inserted between the wavelength band separation means and the wavelength demultiplexing means have therebetween, wherein the input/output port group is connected to the wavelength demultiplexing means via a free space.

According to another embodiment of the present invention, the wavelength demultiplexing means is a bulk diffraction grating.

According to another embodiment of the present invention, an incidence angle of the optical signal to the bulk diffraction grating is different depending on the wavelength band to be wavelength-demultiplexed.

According to another embodiment of the present invention, the optical signal processing device further includes at least N the bulk diffraction gratings and an optical signal different for each of the wavelength bands enters the bulk diffraction grating.

According to another embodiment of the present invention, the groove number of the bulk diffraction gratings is different depending on the wavelength band to be wavelength-demultiplexed.

According to another embodiment of the present invention, the wavelength demultiplexing means is one bulk diffraction grating and includes an angle adjustment means that deflects, within a wavelength demultiplexed surface by the wavelength demultiplexing means, at least one travelling direction of optical signals for the respective wavelength bands incident on the wavelength demultiplexing means.

According to another embodiment of the present invention, the angle adjustment means is a lens receiving at least two or more optical signals of optical signals for the respective wavelength bands and the travelling directions of optical signals for the respective wavelength bands having entered the wavelength demultiplexing means through the lens is different within the wavelength demultiplexed surface.

According to another embodiment of the present invention, the wavelength demultiplexing means is formed on a planar optical circuit substrate.

According to another embodiment of the present invention, the wavelength demultiplexing means includes a plurality of wavelength demultiplexing means using multiple-beam interference corresponding to the wavelength band to be wavelength-demultiplexed and the plurality of wavelength demultiplexing means using the multiple-beam interference have at least one of an effective refractive index, an optical path length difference, a diffraction order, and an emission angle mutually different depending on the wavelength band to be wavelength-demultiplexed.

According to another embodiment of the present invention, the wavelength band separation means is formed on a planar optical circuit substrate.

Advantageous Effects of Invention

The present invention has wavelength demultiplexing means individually designed for the respective wavelength bands and provides a common optical element shared among the respective wavelength bands, such as spatial light modulator and lens, to thereby allow one optical signal processing device to simultaneously operate to a plurality of wavelength bands.

Also according to the present invention, while requiring a similar number of configuration elements as in a conventional optical signal processing device operating at a single wavelength band, various functions such as GE, OCM, WSS, TPA, or MCS can be implemented, thus achieving a network system having a higher capacity and a lower cost at the same time.

DESCRIPTION OF EMBODIMENTS

Figure 1:
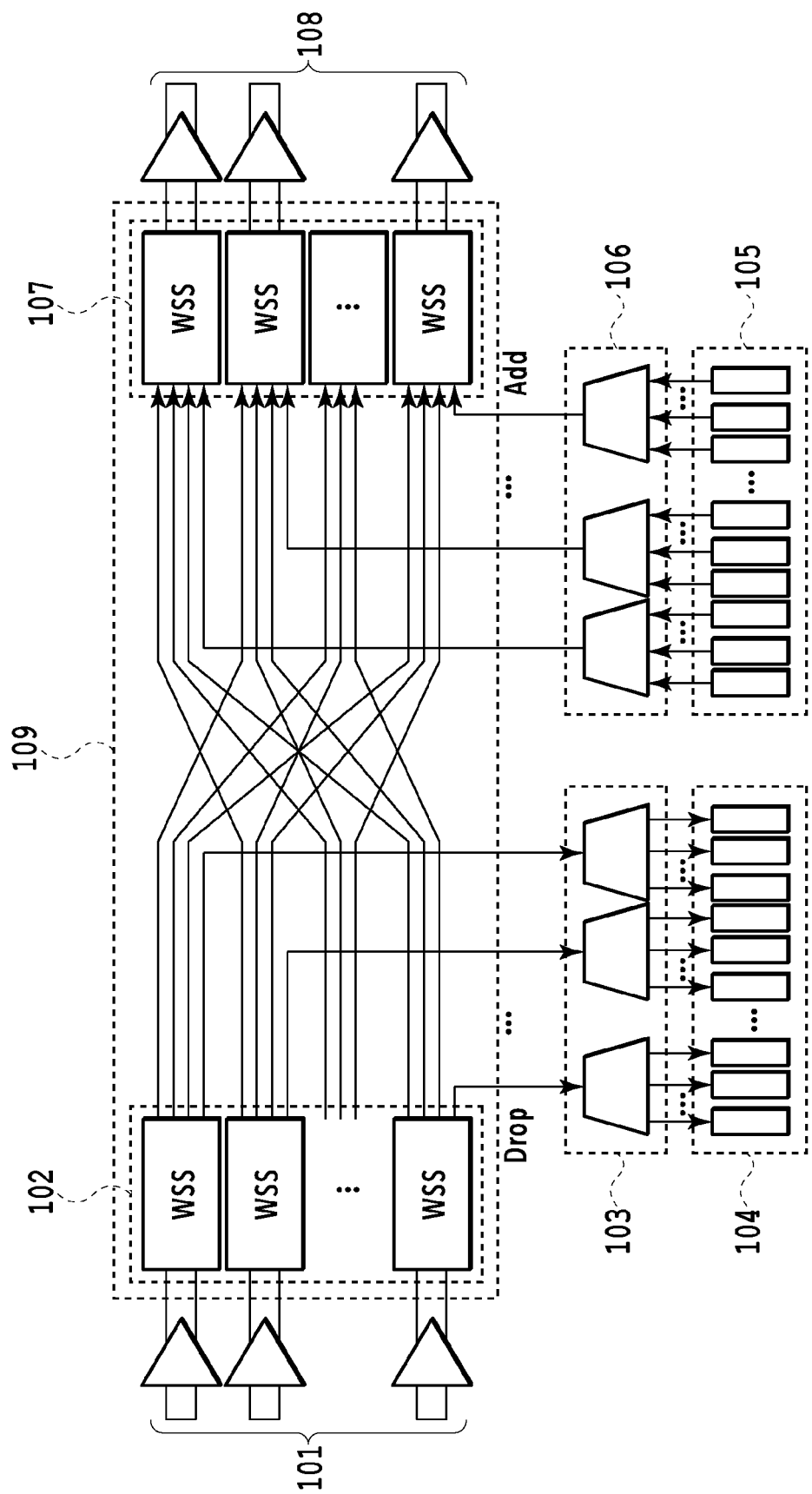
FIG. 1 illustrates a configuration example of a conventional ROADM system.
Figure 2:
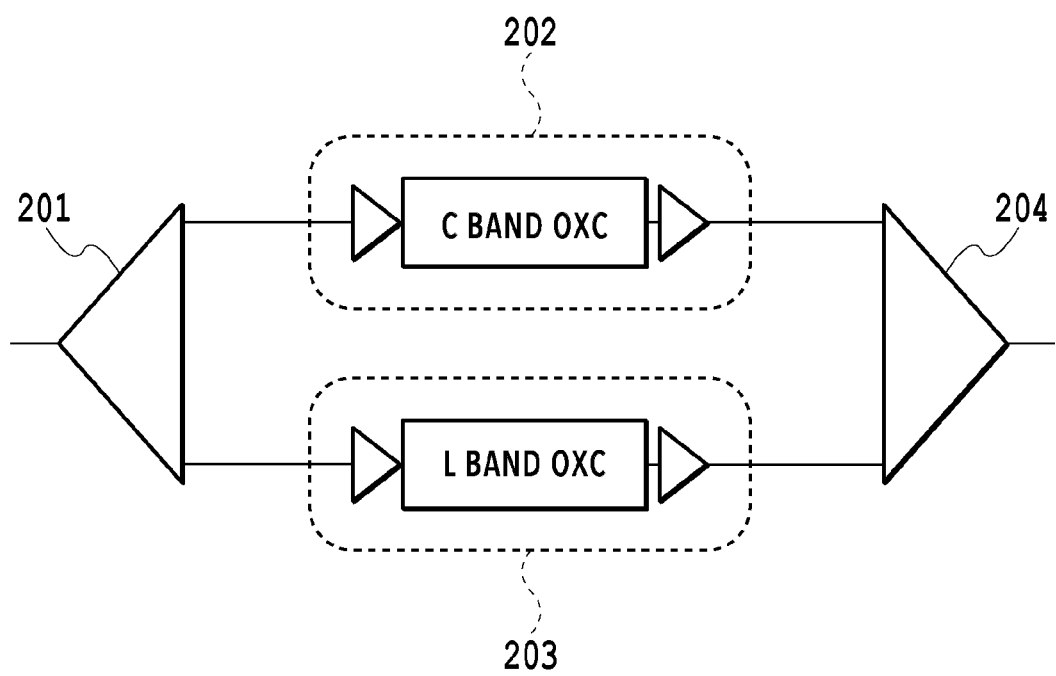
FIG. 2 illustrates a configuration example of a conventional wavelength band-expanded ROADM node.

The following section will describe an embodiment of the present invention in detail.

Embodiment 1

The following section will describe an embodiment to carry out the present invention. However, the present invention is not limited to an illustrative example. In all of the drawings, the same reference numerals denote the same or similar parts. In the following description, it is assumed that a direction along which the wavelength demultiplexing by a diffraction grating is performed on a plane of a spatial light modulator is defined as the x axis, an axis orthogonal to the x axis is defined as the y axis, and a direction orthogonal to the x axis and the y axis is defined as the z axis. For simpler illustration, the C band and the L band will be handled as a wavelength band. A configuration is shown in which the total of three input/output ports for the respective wavelength bands is used. However, the type and the number of the wavelength band or the number or layout of input/output ports are not limited to this description. For example, when a device is structured that not only handles the C band and the L band as a wavelength band but also handles the O band, the E band, and the S band collectively, then five types of wavelength bands can have different diffraction grating designs by a method described later and the respective designed diffraction gratings also can be integrated. Regarding the principal ray of a transmitted optical signal, the principal ray of the optical signal related to the C band is shown by the solid line and the principal ray of the optical signal related to the L band is shown by the broken line, respectively.

Figure 3A:
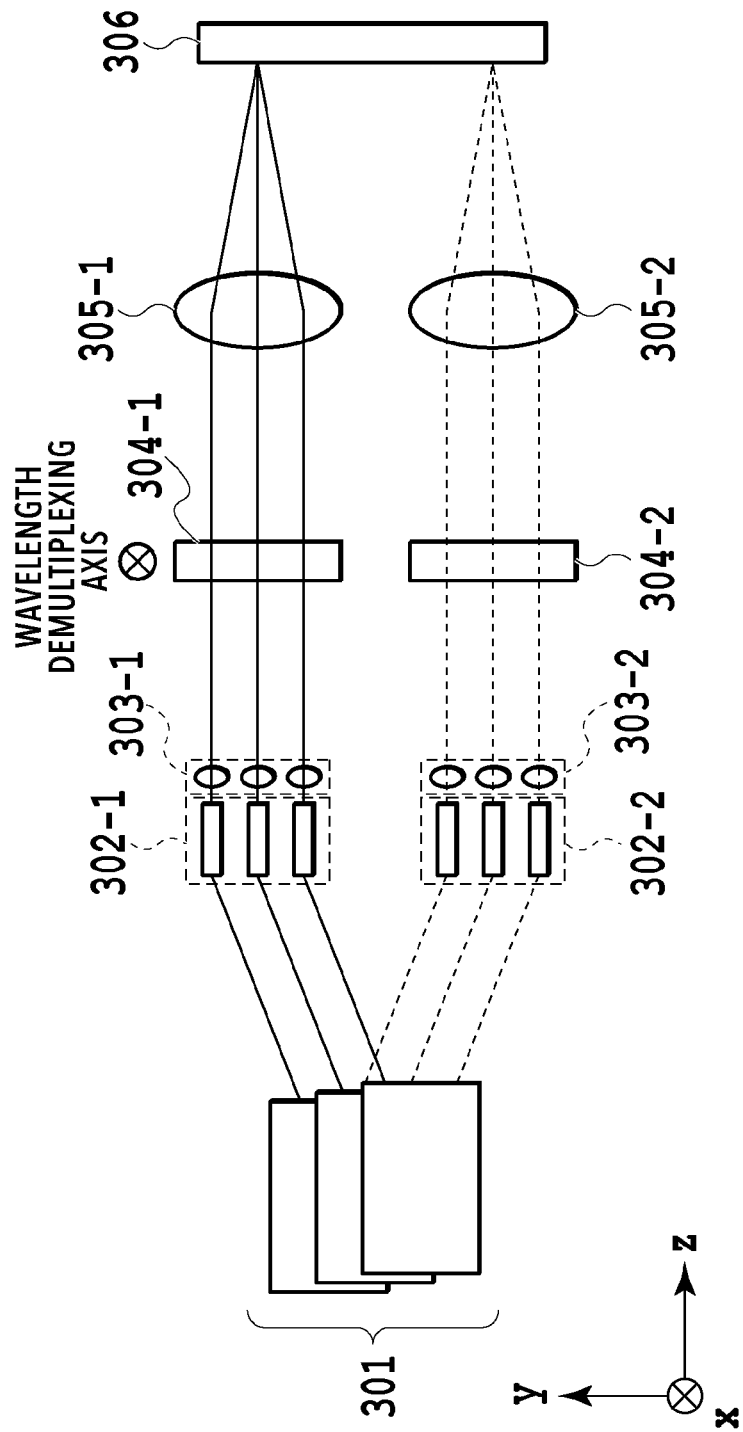
FIG. 3A illustrates the configuration of an optical signal processing device according to Embodiment 1 of the present invention seen from the x axis direction.
Figure 3B:
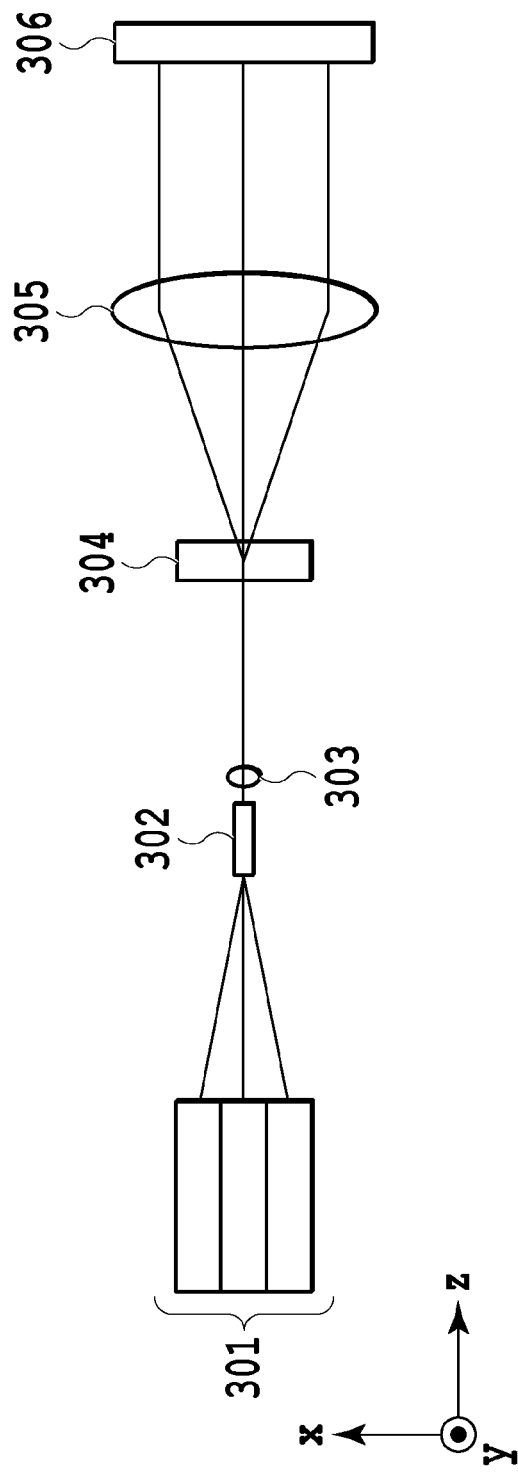
FIG. 3B illustrates the configuration of an optical signal processing device according to Embodiment 1 of the present invention seen from the y axis direction.

FIG. 3A and FIG. 3B illustrate the configuration of an optical signal processing device according to Embodiment 1 of the present invention. The optical signal processing device according to this embodiment is configured to have a WDM coupler array 301 in which the respective ports have a plurality of WDM couplers for separating the C band and the L band, input/output port groups 302 provided for the C band and the L band, respectively, a micro lens array 303, a diffraction grating 304, a lens 305, and a spatial light modulator 306 arranged in this order.

For realizing a WDM coupler used as the WDM coupler array 301, there are various scheme such as a lattice filter circuit based on a multistage Mach-Zehnder interferometer, a fiber, or a multilayer film filter, any of which may be used so long as a similar function is achieved.

In the description in this embodiment, one lens 305 is used for each wavelength band. However, any number of lens(es) in any layout may be used so long as the configuration has a similar optical characteristic. Some optical system designs may arrange the lens 305 between the micro lens array 303 and the diffraction grating 304. Another structure also may be used for the purpose of reducing the aberration or providing a shorter optical system in which each lens 305 is composed of two or more lenses to sandwich the diffraction grating 304.

The following section will describe the operation of the optical signal processing device of the present invention. First, an optical signal inputted to the WDM coupler array 301 is outputted to the respective ports of the input/output port group 302 that are different for the C band and L band wavelength bands. The optical signal received by the input/output port group 302 is emitted as collimate light into a space through the micro lens array 303. The signal light transmitted through the space is wavelength-demultiplexed by the diffraction grating 304 and is light-collected by the lens 305 and is light-collected by the spatial light modulator 306.

During this, the signals included in the respective C band and L band are designed to be light-collected at different y coordinates depending on the respective wavelength bands. In FIG. 3A, an optical signal having a wavelength included in the C band is sent through the first input/output port group 302-1, the first micro lens array 303-1, the first diffraction grating 304-1, and the first lens 305-1 and is light-collected on a reflection surface of the spatial light modulator 306. An optical signal having a wavelength included in the L band on the other hand is sent through the second input/output port group 302-2, the second micro lens array 303-2, the second diffraction grating 304-2, and the second the lens 305-2 and is light-collected at the y coordinate different from the light collecting position of the C band of the spatial light modulator 306.

During this, the spatial light modulator 306 performs the light collection at separate positions for the respective wavelengths, thus allowing all wavelengths to be phase-modulated independently. Light subjected to the desired phase modulation by the spatial light modulator 306 is reflected and is deflected within a y-z plane to have an angle corresponding to any desired port of the input/output port group 302. The deflected light is sent through the lens 305, the diffraction grating 304, and the micro lens array 303 again and is optically-coupled by an input/output port 302 depending on the deflection angle. This operation is performed both on the C band and the L band and the respective wavelength bands are again multiplexed by the WDM coupler array 301.

Figure 4:
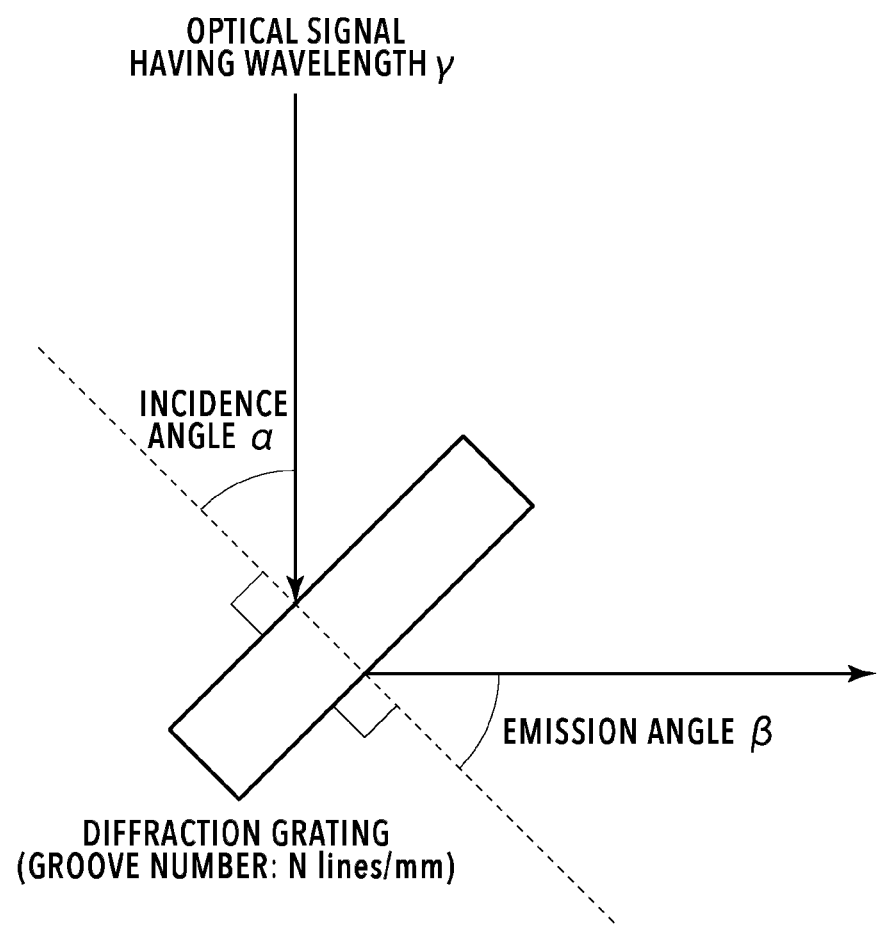
FIG. 4 illustrates the operation of a diffraction grating.

FIG. 4 illustrates the operation of the diffraction grating. As shown in FIG. 4, when an optical signal having a wavelength $\lambda$ enters the diffraction grating having the groove number N (lines/mm) at an incidence angle $\alpha$ ($0<\alpha<\pi$), the emission angle $\beta$ ($0<\beta<\pi$) after the diffraction can be represented by the following formula (1) when assuming that the diffraction order is m.

Formula 1

$$\sin \alpha + \sin \beta = Nm\lambda \quad (1)$$

Thus, the first diffraction grating 304-1 and the second diffraction grating 304-2 in FIG. 3A and FIG. 3B are configured so that, so long as the incidence angle $\alpha$, the diffraction grating groove number N, and the diffraction order m are uniform, the separation to the C band and the L band on the spatial light modulator 306 can be performed in the x axis direction by the WDM coupler array 301. However, the wavelength demultiplexing in the y axis direction is uniformly performed regardless of the C band and the L band. The situation as described above undesirably causes a dead space in which the spatial light modulator 306 cannot participate in the modulation of an optical signal.

Figure 5A:
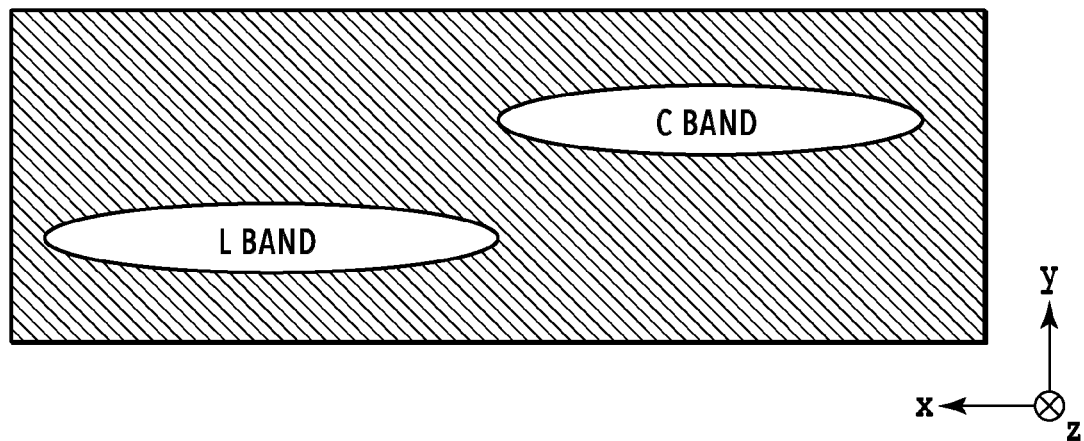
FIG. 5A illustrates an irradiation region on a spatial light modulator of each wavelength band when a wavelength demultiplexing is performed uniformly.

The spatial light modulator 306 may include an LCOS (Liquid Crystal on Silicon) for example. However, general spatial light modulators such as LCOS have limitation on a higher area or higher pixelization. Thus, in the case of an optical design that has an extremely-large dead space among limited pixels as described above (FIG. 5A), the spatial resolution per a unit wavelength is limited remarkably, which causes a significantly-deteriorated characteristic.

Figure 5B:
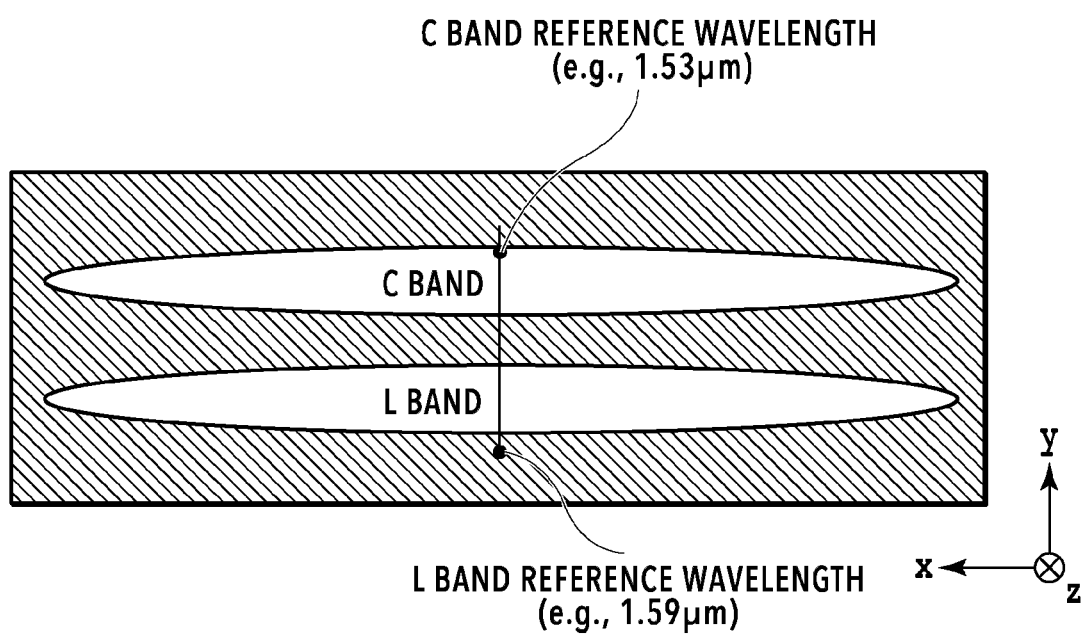
FIG. 5B illustrates the irradiation region of each wavelength band on the spatial light modulator when the respective wavelength bands are wavelength-demultiplexed under different conditions so that the reference wavelengths of the respective wavelength bands have the same x coordinate.

In order to solve this, when the respective wavelengths used as a reference are set in the respective wavelength bands, as shown in FIG. 5B, the respective reference wavelengths are allowed to have the same x coordinate to thereby eliminate the dead space in the spatial light modulator 306. In order to achieve the design as described above, the respective diffraction gratings must be adjusted so as to provide different wavelength dispersion status to optical signals having the respective wavelength bands.

For example, the first diffraction grating 304-1 and the second diffraction grating 304-2 are both set to have a diffraction order of +1. The first diffraction grating 304-1 of the C band is designed to have N=1000, α=45 deg, β=55.38, and the reference wavelength $\lambda_C$=1530 nm. In this case, the second diffraction grating 304-2 of the L band of the reference wavelength $\lambda_L$=1590 nm is designed, when considering the formula (1), so that the three degrees of freedom of the incidence angle α, the emission angle β, and the diffraction grating groove number N are adjusted. Table 1 shows the design examples when these parameters are changed.

Table 1 shows three L band diffraction grating design examples to one C band diffraction grating design example. The L band design example (1) is an example in which the L band diffraction grating groove number is changed so as to allow the incidence angle α and the emission angle β to be equal. The L band design example (2) is an example in which the L band incidence angle α is changed so as to allow the emission angle β and the groove number to be equal. The L band design example (3) is an example in which the L band emission angle β is changed so as to allow the incidence angle α and the groove number to be equal.

TABLE 1

|  | C band design example | L band design example (1) | L band design example (2) | L band design example (3) |
|---|---|---|---|---|
| N(lines/mm) | 1000 | 962.26 | 1000 | 1000 |
| M | 1 | 1 | 1 | 1 |
| λ(nm) | 1530 | 1590 | 1590 | 1590 |
| α(deg) | 45 | 45 | 50.09 | 45 |
| β | 55.38 | 55.38 | 55.38 | 61.99 |

The design as described above provides individual optical designs to the respective C band and L band to reduce the dead space on the spatial light modulator 306. As a result, such an optical signal processing device is realized that can simultaneously control the C band and the L band while having a sufficient characteristic and that provides an ultrawideband operation.

An illustrative combination of the C band design example and the L band design example (1) allows, while the incidence angle α and the emission angle β are the same for the respective reference wavelengths, only the groove number N to be design-changed using the C band and the L band, thereby easily realizing the operation of FIG. 5B.

In this embodiment, any device function can be realized by the details of the phase modulation implemented by the spatial light modulator 306. For example, by performing a linear phase modulation with regard to the y axis direction, the deflection of an optical signal within the y-z plane can be carried out. As a result, a port to be recoupled can be changed depending on a deflection angle. Thus, when an individual phase setting is possible for each wavelength, the function of key components of one WSS the above-described ROADM node can be realized. Furthermore, the WDM coupler can provide the separation to the C band and the L band to provide an individual phase modulation. Thus, the ultrawideband WSS all including the C band+the L band can be realized by one spatial light modulator 306.

On the other hand, it has been widely-known that a quadratic function-like phase modulation performed by the spatial light modulator 306 with regard to the x axis direction causes the generation of wavelength dispersion. Thus, a variable optical wavelength dispersion compensator can be provided without requiring a design change of the optical system. Similarly, some phase change can be given to partially block the recoupling to the input/output port to thereby freely set the loss to an arbitrary wavelength. The use of this phenomenon can also realize a very-easy operation of the gain equalizer to an optical amplifier.

From the above description, the optical design of this embodiment can realize an ultrawideband optical signal processing device that has various many functions and that handles the C band and the L band.

Embodiment 2

Figure 6A:
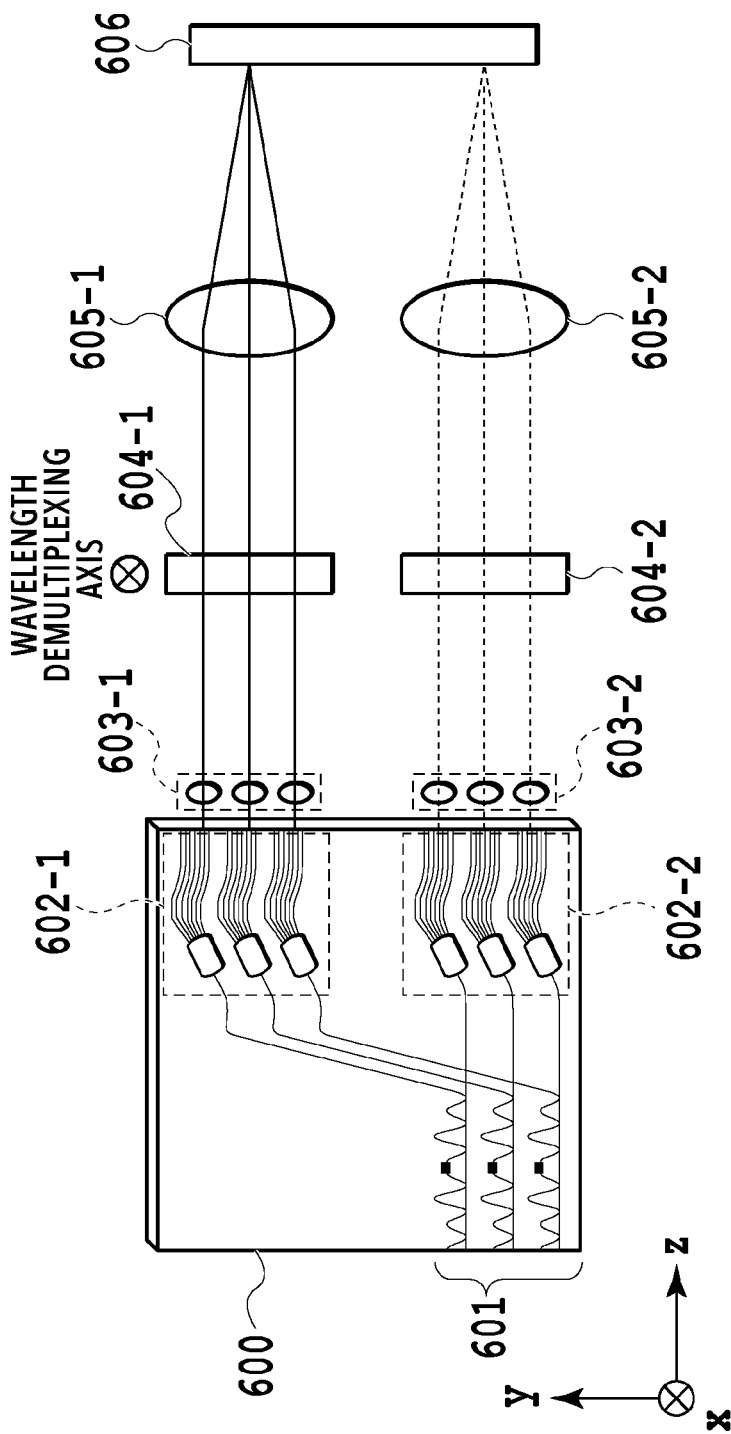
FIG. 6A illustrates the configuration of the optical signal processing device according to Embodiment 2 of the present invention seen from the x axis direction.
Figure 6B:
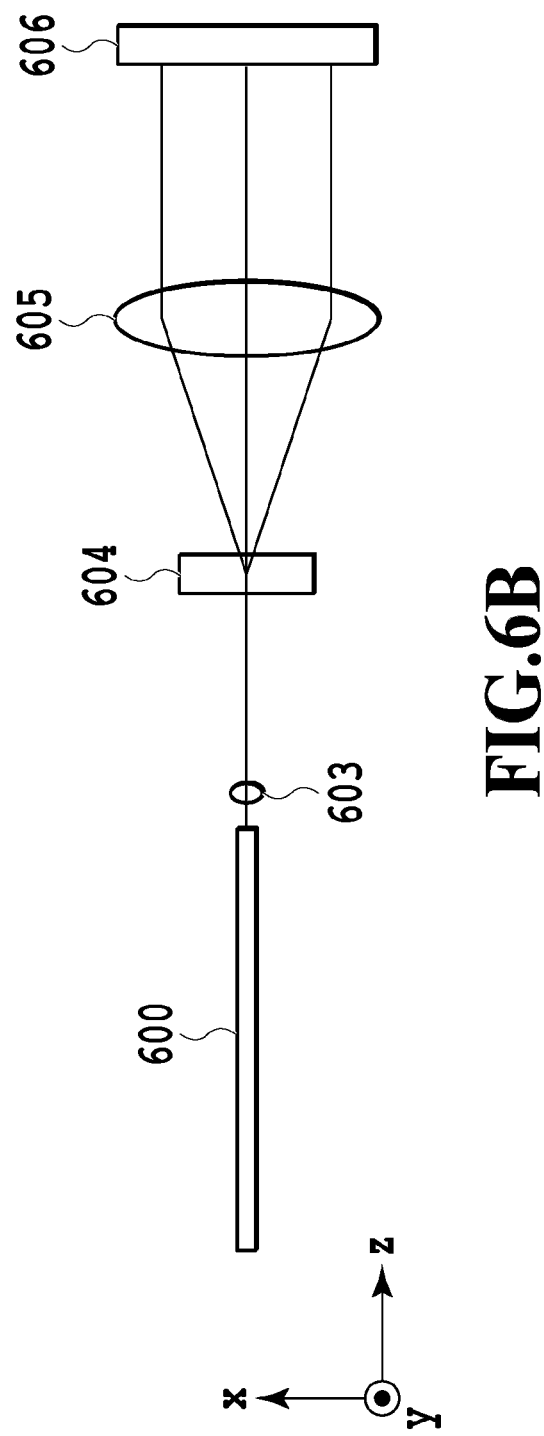
FIG. 6B illustrates the configuration of the optical signal processing device according to Embodiment 2 of the present invention seen from the y axis direction.

FIG. 6A and FIG. 6B illustrate the configuration of the optical signal processing device according to Embodiment 2 of the present invention. The optical signal processing device according to this embodiment includes an optical waveguide substrate 600 including a WDM coupler array 601 and an input/output port group 602, a micro lens array 603, a diffraction grating 604, a lens 605, and a space phase modulator 606 arranged in this order. The optical waveguide substrate 600 includes WDM couplers for separating the C band and the L band provided as arrays in an amount depending on the number of input/output ports. In FIG. 6A and FIG. 6B, the input/output port group 602 is shown as being composed of a slab waveguide and an array waveguide.

As illustrated in Embodiment 1, the WDM coupler array 601 may be provided as another device at the exterior of the optical waveguide substrate 600. On the other hand, when a Mach-Zehnder interferometer-based lattice filter circuit-type one is used, it can be provided as an optical circuit in the optical waveguide substrate 600, thus realizing a lower-cost implementation. It is assumed that the WDM coupler array 601 in this embodiment is shown to have a lattice filter-type configuration composed of a multistage-connected Mach-Zehnder interferometer as described above. However, any circuit configuration may be used so long as the circuit is an optical circuit having a similar function.

Although the details will be described later, an optical signal transmitted through the optical waveguide substrate 600 is generally determined based on the composition of a substrate or the size of an optical signal transmission layer. Thus, merely allowing an optical signal transmitted through the optical waveguide substrate 600 to be emitted to the space fails to provide a degree of freedom to the opening number (NA: Numerical Aperture) of an optical signal transmitted through the space. However, the NA is very important information for the optical design, thus having a significant influence on the height of the entire optical system, the optical length, the aberration design, the component size and the cost. Therefore, the NA at the boundary region between the input/output waveguide and the slab waveguide or a beam diameter adjusting element is desired.

FIG. 7A to FIG. 7D illustrate a waveguide structure to adjust the beam diameter according to this embodiment of the present invention and illustrate, for only one input/output waveguide, the shape of the boundary region between the input/output waveguide and the slab waveguide.

Figure 7A:
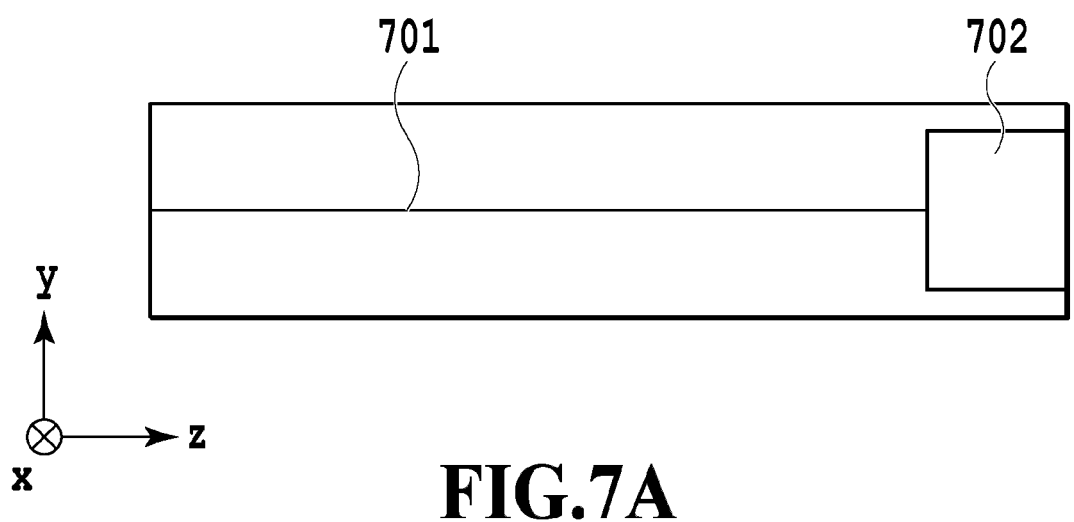
FIG. 7A illustrates a waveguide structure example for adjusting a beam diameter in which a linear waveguide 701 corresponding to an input/output waveguide is connected to a slab waveguide 702.
Figure 7B:
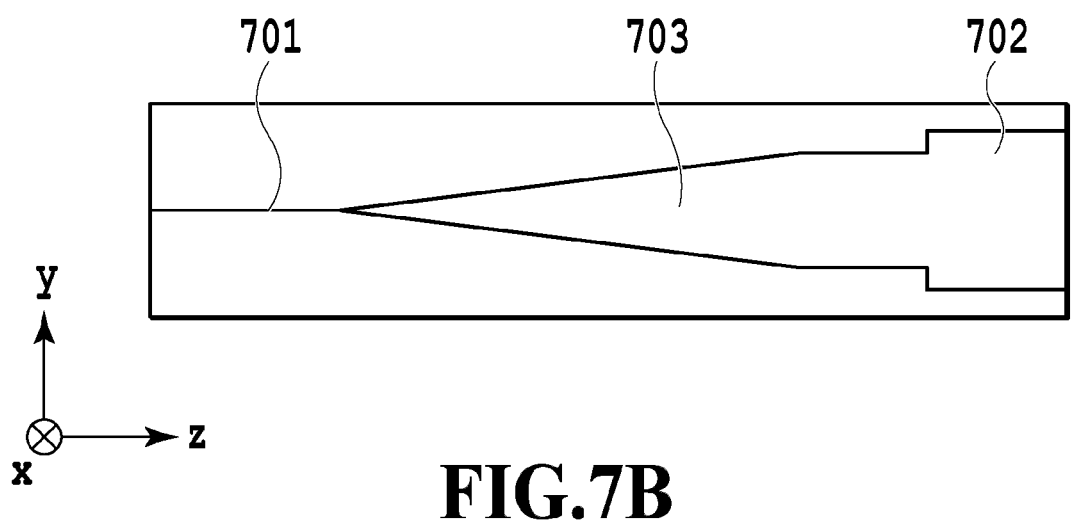
FIG. 7B illustrates a waveguide structure example for adjusting a beam diameter in which the linear waveguide 701 and the slab waveguide 702 have therebetween a tapered structure waveguide 703 having a width gradually increasing from the waveguide width of the linear waveguide 701.
Figure 7C:
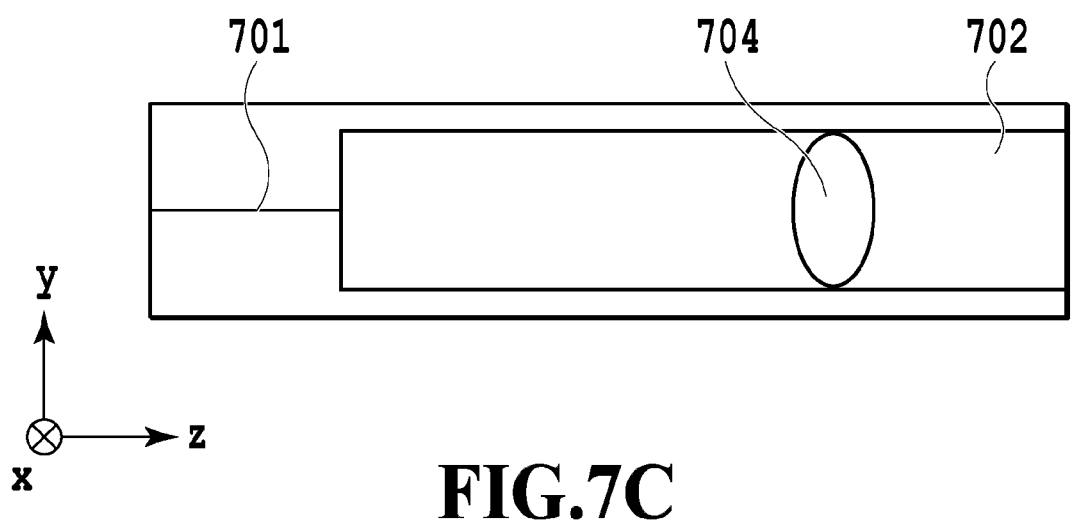
FIG. 7C illustrates a waveguide structure example for adjusting a beam diameter in which the slab waveguide includes a lens function part 704 having a convex lens function.
Figure 7D:
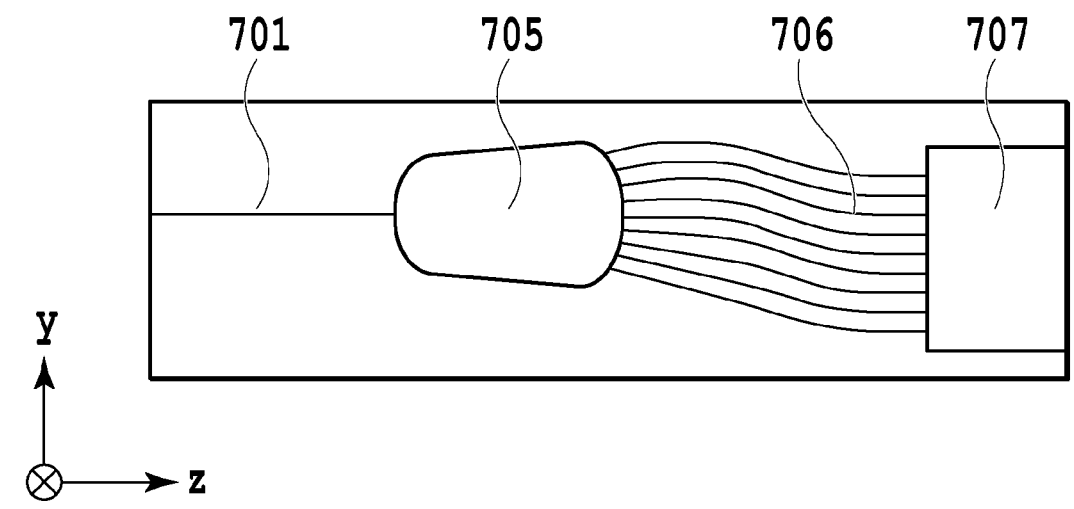
FIG. 7D illustrates a waveguide structure example for adjusting a beam diameter in which the linear waveguide 701 is followed by the first slab waveguide 705, an array waveguide 706, and the second slab waveguide 707 corresponding to the above-described slab waveguide 702 arranged in this order.

FIG. 7A shows the linear waveguide 701 corresponding to the input/output waveguide connected to the slab waveguide 702. The narrow linear waveguide 701 providing a very-strong confinement allows an optical signal transmitted from the slab waveguide 702 to have a high NA. FIG. 7B to FIG. 7D show an example for controlling this in a direction along which the NA is reduced.

FIG. 7B illustrates an example in which the linear waveguide 701 and the slab waveguide 702 have therebetween the tapered structure waveguide 703 having a width gradually increasing from the waveguide width of the linear waveguide 701. Light transmitted by the tapered structure waveguide while being subjected to heat insulation has a function to convert a beam diameter, thus allowing a simple design to provide a beam having a larger diameter.

FIG. 7C illustrates an example in which the slab waveguide includes the lens function part 704 having a convex lens function. The lens function part can be realized by arranging substance having a refractive index different from the refractive index of the waveguide, e.g., resin, air, in an appropriate layout, thereby collimating a beam while allowing the beam to be transmitted through the optical waveguide substrate 600.

FIG. 7D illustrates a part of the optical circuit illustrated in FIG. 6A and FIG. 6B. The linear waveguide 701 is followed by the first slab waveguide 705, the array waveguide 706, and the second slab waveguide 707 corresponding to the above slab waveguide 702 arranged in this order.

Figure 8:
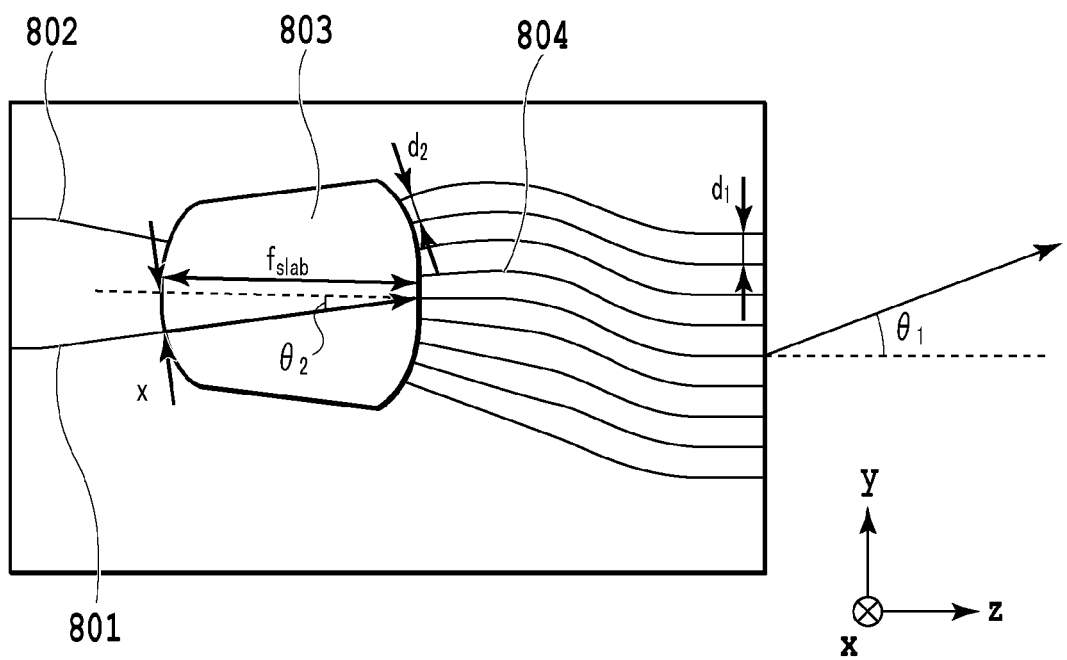
FIG. 8 illustrates the operation of the waveguide structure shown in FIG. 7D.

Among circuit functions for adjusting the NA, the detailed explanation of the operation of the waveguide structure shown in FIG. 7D is shown in FIG. 8. This circuit is a circuit generally called a spatial beam transformer (SBT). This circuit generally has a structure close to AWG used as a wavelength multi/demultiplexer. The array waveguide 706 is designed to have a structure by which an adjacent waveguide has an equal optical path length difference (i.e., ΔL=0). It is assumed that signal light emitted from the input/output port and the array waveguide to a slab waveguide 803 has a beam diameter $w_{W_G}$ in the y axis direction, the distance from a position at which the first input/output waveguide 801 is connected to the slab waveguide 803 to the center line of the slab waveguide 803 is x, an angle in the slab waveguide 803 formed by the principal ray of the signal light emitted from the first input/output waveguide 801 and the z axis is $\theta_2$, the slab waveguide 803 has a length $f_{slab}$, and the slab waveguide 803 has a refractive index $n_s$, the array waveguide 804 connected to the slab waveguide 803 with a pitch $d_2$, the array waveguide 804 at an end face of the optical waveguide substrate 600 has a pitch $d_1$, and the signal light emitted from the first input/output port 801 has a beam diameter $w_{SBT}$ with regard to the y axis direction, and the angle formed by the principal ray of the signal light and the z axis is $\theta_1$. Then, the above parameters are based on the following relational expression.

Formula 2

$$w_{SBT} = \frac{f_{slab}\lambda}{n_s \pi w_{WG}} \frac{d_1}{d_2} \quad (2)$$

Formula 3

$$\theta_2 = \arcsin\left(n_s \frac{d_1}{d_2}\sin\theta_1\right) = \arcsin\left(n_s \frac{d_1}{d_2}\sin\left(\frac{x}{f_{slab}}\right)\right) \quad (3)$$

Thus, the emitted beam diameter (i.e., NA) can be controlled based on the formula (2). The emitted beam angle can be controlled based on the formula (3). When the first input/output waveguide 801 and the second input/output waveguide 802 are designed to have $\theta_2$ or x based on different parameters, a position at which the beam is emitted to the space is the same regardless whether the optical signal is emitted from the first input/output waveguide 801 or the second input/output waveguide 802. However, the beam also can be emitted at different angles to the space.

This illustrative example will be described based on an assumption that $\theta_2$ is 0 and the second input/output waveguide 802 is not provided and a plurality of SBT circuits are arranged in parallel. Of course, the SBT parameter design is not limited to the above one. Thus, any parameter can be used so long as the parameter has a configuration that may achieve the function of this optical signal processing device including a lens for example.

In the configuration of FIG. 7D, the first slab waveguide 705 has a beam expansion function using a free space transmission or a lens function. The array waveguide 706 has a function to correct the phase of each waveguide. Thus, the beam emitted from the second slab waveguide 707 can be formed as a plane wave sufficiently thick in the y axis direction.

As typically described above, by changing the circuit layout at the boundary region between the input/output port group and the slab waveguide in FIG. 7A to FIG. 7D, the beam diameter (i.e., NA) can be adjusted without requiring an additional cost.

Of course, the NA adjustment method is not limited to the methods shown in FIG. 7A to FIG. 7D. Thus, the NA also can be adjusted by a circuit design based on a combination of a plurality of methods or a totally-different configuration.

Even when the method for adjusting the NA is provided as described above, an optical design can have a further degree of freedom by providing the micro lens array 603 in the vicinity of the optical waveguide substrate 600 to thereby further adjust the NA of the beam emitted to the space.

In the description of this embodiment, only one lens was used as the lens 605. However, any number of lenses also may be used so long as the lenses have a configuration having a similar optical characteristic and any layout also may be used. Some optical designs can provide a configuration in which the lens 605 is provided between the optical waveguide substrate 600 and the diffraction grating 604.

In this illustrative example, the WDM coupler array 301 in FIG. 3A and FIG. 3B, the input/output port group 302 including the NA adjustment mechanism, and the micro lens array 303 are all integrated on the optical waveguide substrate 600. Thus, only one optical waveguide substrate 600 is required without the need for individually preparing a WDM coupler array or generally-used fiber array or micro lens array, thus achieving a significant reduction of the component cost.

Furthermore, all optical circuits formed on the optical waveguide substrate 600 eliminates the need for alignment, thus significantly reducing the implementation cost. In addition, since the optical waveguide substrate is implemented at an accuracy generally on the order of submicron or less, the optical waveguide substrate is implemented in a more stable and more accurate manner than the alignment of the spatial optical system. Even when the optical system is corrected, the correction can be achieved by merely adjusting the circuit layout. Thus, such a configuration can be provided that realizes, while maintaining the significant advantage described in Embodiment 1, a further-reduced cost and a significantly-reduced alignment load.

Embodiment 3

Figure 9A:
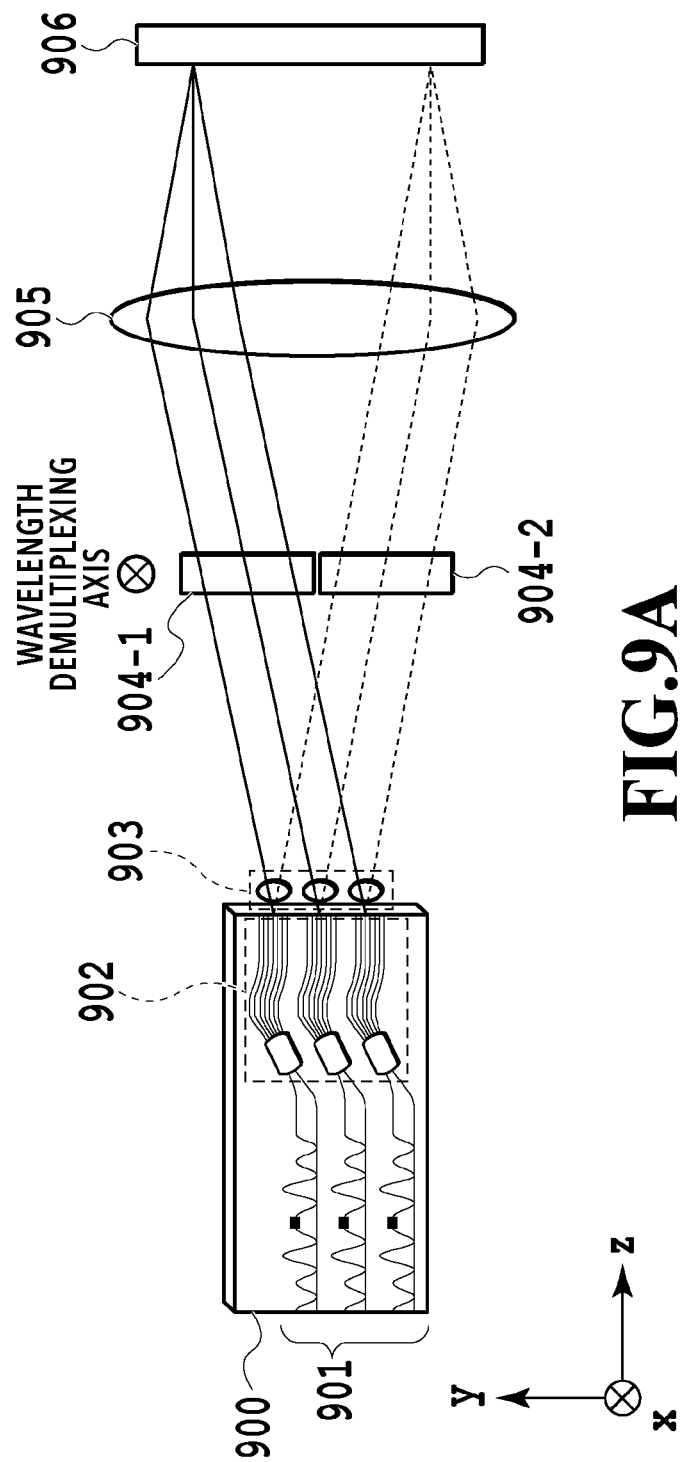
FIG. 9A illustrates the configuration of the optical signal processing device according to Embodiment 3 of the present invention seen from the x axis direction.
Figure 9B:
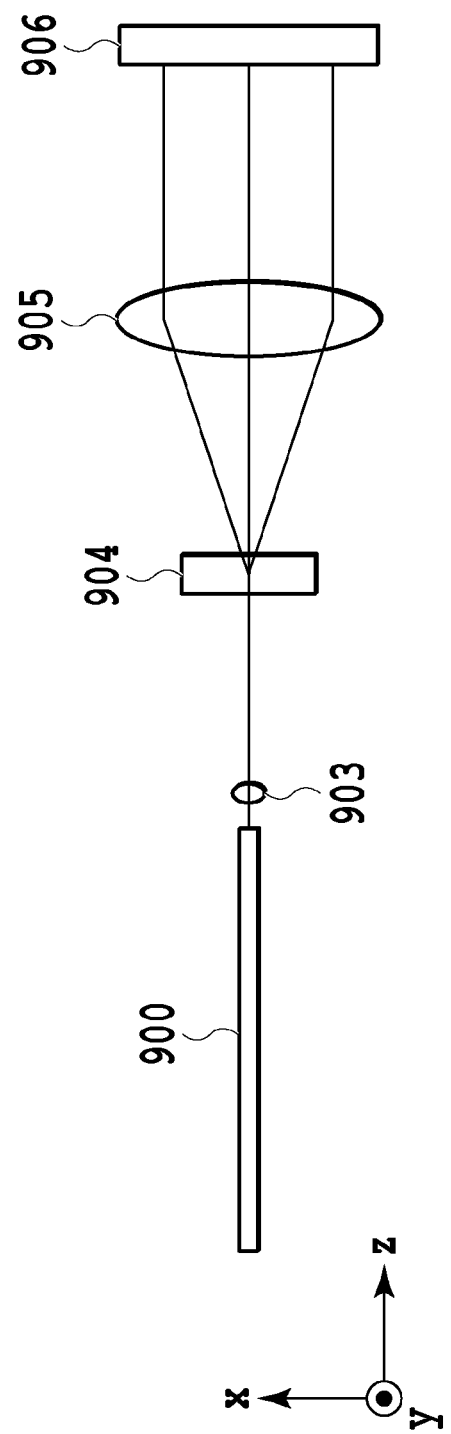
FIG. 9B illustrates the configuration of the optical signal processing device according to Embodiment 3 of the present invention seen from the y axis direction.

FIG. 9A and FIG. 9B illustrate the configuration of the optical signal processing device according to Embodiment 3 of the present invention.

As shown in FIG. 9A and FIG. 9B, the optical signal processing device according to this embodiment includes an optical waveguide substrate 900 including a WDM coupler array 901 and an input/output port group 902, the micro lens array 903, a diffraction grating 904, a lens 905, and a space phase modulator 906 arranged in this order. The optical waveguide substrate 900 includes therein WDM couplers for separating a C band and an L band that are arranged in an amount corresponding to the number of input/output ports. In Embodiment 1 and Embodiment 2, the input/output ports are provided separately to correspond to the respective ports for the C band and the L band. In this embodiment on the other hand, waveguides in which C band and L band wavelength bands separated by one WDM coupler are transmitted are connected at different positions of a single SBT. As a result, optical signals emitted from the optical waveguide substrate 900 into a free space are emitted, although having been emitted from the same emission position, through the C band and the L band at different angles. Thus, a micro lens array 903 and the lens 905 have common components to the respective optical signals of the C band and the L band.

The following section will describe in detail the operation of the optical signal processing device of this embodiment. First, an optical signal inputted to the WDM coupler array 901 is outputted to different ports for the respective C band and L band wavelength bands. Thereafter, the signals of the C band and L band wavelength bands outputted from the respective WDM couplers are connected to one of the SBT circuits provided as the input/output port group 902. The signals of the C band and L band wavelength bands are inputted to the slab waveguide from different positions. Thus, as shown in the formula (3), the beam emitted from the SBT circuit to the free space is emitted through the C band and the L band at different angles.

The optical signal emitted to the free space via the input/output port group 902 configured by the SBT circuit is emitted as collimate light to the space via the micro lens array 903. The signal light transmitted through the space is allowed via the C band and the L band to enter the independently-provided first diffraction grating 904-1 and second diffraction grating 904-2. The resultant light is wavelength-demultiplexed and is light-collected by the lens 905 and is light-collected by a spatial light modulator 906.

During this, the signals included in the C band and the L band, respectively, are transmitted through the free space at different angles and thus are designed to be light-collected at different y coordinates by the single lens 905 depending on the respective wavelength bands at the spatial light modulator 906.

The light having subjected to a desired phase modulation by the spatial light modulator 906 is reflected by the spatial light modulator 906 and is deflected within a y-z plane at a desired angle. The resultant light is sent again through the lens 905, the diffraction grating 904, and the micro lens array 903 and is optically-coupled to the input/output port 902 depending on the deflection angle. This operation is carried out for both of the C band and the L band. Thus, the respective wavelength bands is multiplexed again by the WDM coupler array 901.

In this embodiment, the micro lens arrays and the lenses, which are required for the C band and L band optical systems in Embodiments 1 and 2, respectively, can be designed as a single component. This provides a significant effect on the reduction of the component cost and also provides a halved preparation for the alignment of the respective optical components, thereby providing a reduced implementation cost. Furthermore, the number of input/output port groups implemented on the optical waveguide substrate 900 is also halved, thus achieving an optical waveguide substrate having a smaller size. Thus, this embodiment can achieve a smaller size and a lower cost than in the case of Embodiment 2 having a significant effect on the cost reduction.

Embodiment 4

Figure 10A:
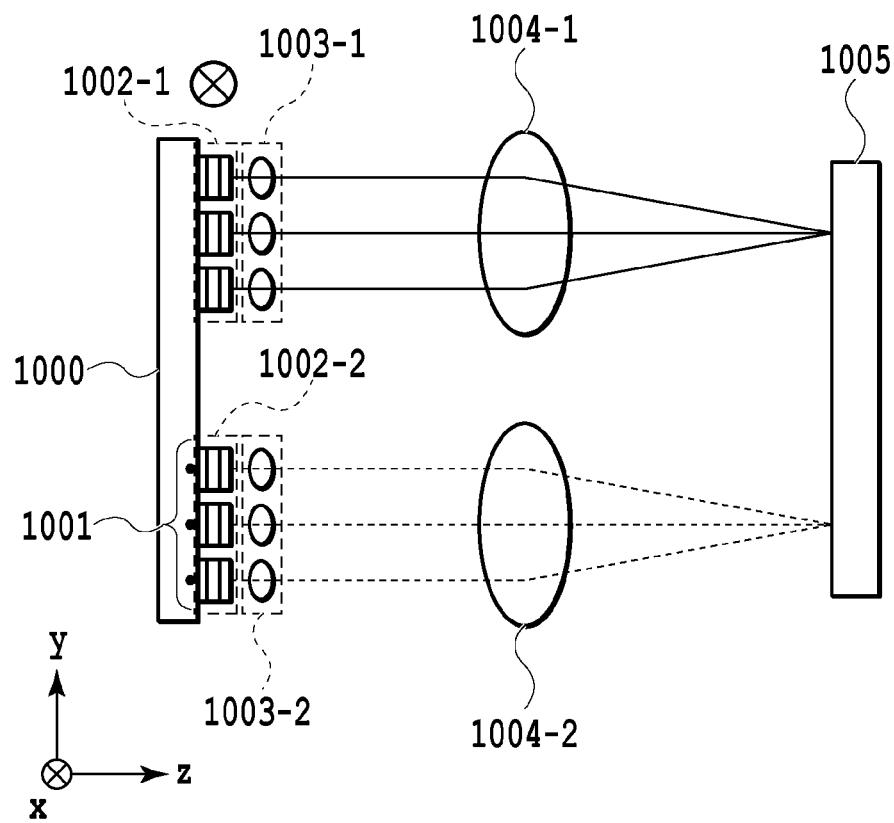
FIG. 10A illustrates the configuration of the optical signal processing device according to Embodiment 4 of the present invention seen from the x axis direction.
Figure 10B:
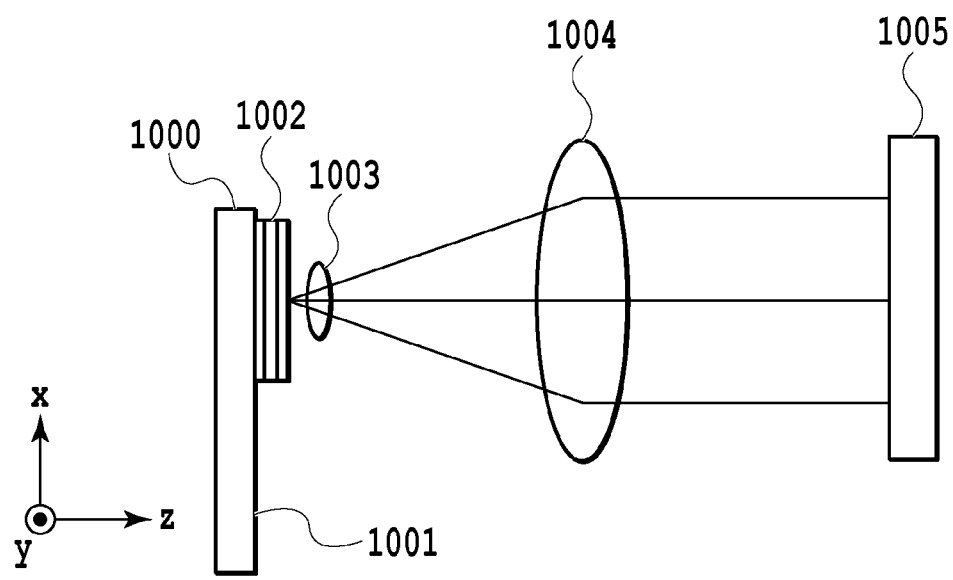
FIG. 10B illustrates the configuration of the optical signal processing device according to Embodiment 4 of the present invention seen from the y axis direction.

FIG. 10A and FIG. 10B illustrate the configuration of the optical signal processing device according to Embodiment 4 of the present invention.

As shown in FIG. 10A and FIG. 10B, the optical signal processing device according to this embodiment includes the optical waveguide substrate 1000, a WDM coupler array 1001 formed on the optical waveguide substrate 1000, a diffraction grating array 1002, a micro lens array 1003, a lens 1004, and a space phase modulator 1005 arranged in this order.

Figure 11A:
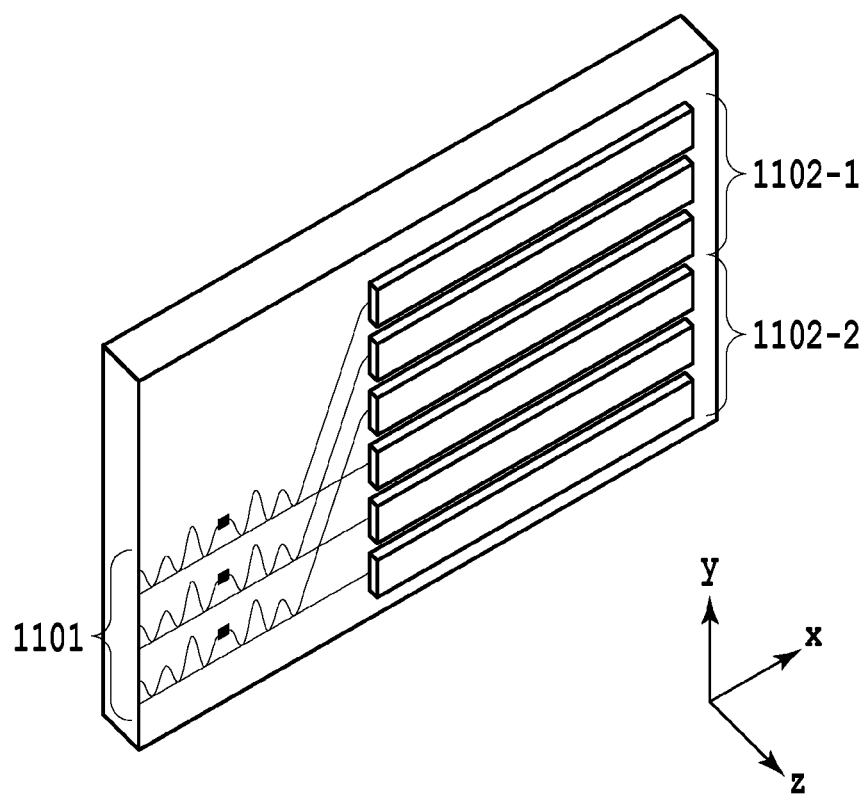
FIG. 11A illustrates a configuration example in which a grating coupler-type multi/demultiplexer is applied to an optical waveguide substrate 1000.
Figure 11B:
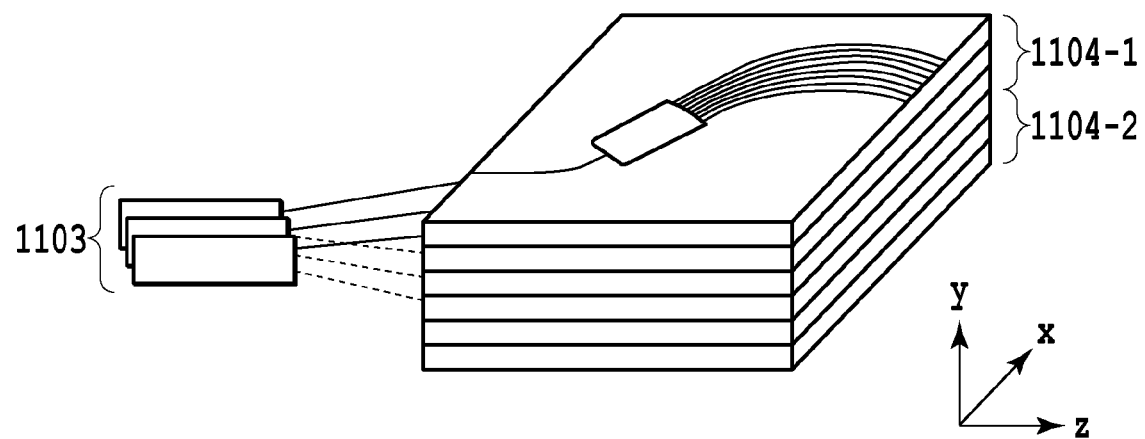
FIG. 11B illustrates a configuration example in which an AWG-type diffraction grating array 1104 is applied as a multi/demultiplexer to the diffraction grating array of the optical waveguide substrate 1000.

FIG. 11A and FIG. 11B show the details of the optical waveguide substrate 1000. FIG. 11A illustrates a configuration example wherein a grating coupler-type multi/demultiplexer is applied. In FIG. 11A, as in Embodiment 2 and Embodiment 3, the wavelength band demultiplexing to the C band and the L band is performed on an optical waveguide-type WDM coupler array 1101 based on a Mach-Zehnder interferometer on the optical waveguide substrate 1000. Thereafter, a grating coupler-type diffraction grating array 1102 is provided that is optimally designed for the respective wavelength bands. The grating coupler-type diffraction grating is an optical circuit that has a cyclic refractive index change or a partial transmission structure in an optical signal transmission direction in the optical waveguide substrate and that has a demultiplexing function. The grating coupler-type diffraction grating is a wavelength multi/demultiplexer using a multiple-beam interference. Thus, the operation center wavelength can be represented by the formula (4) when assuming that the operation center wavelength is $\lambda_0$, the waveguide refractive index is $n_{eff}$, the optical path length between adjacent point light sources among a plurality of point light sources caused by a refractive index cycle medium is p, and the diffraction order is m.

Formula 4

$$\lambda_0 = \frac{n_{eff}\, p}{m} \quad (4)$$

According to the formula (4), any of the waveguide refractive index $n_{eff}$, the optical path length p between adjacent point light sources, and the diffraction order m can be adjusted to thereby change the operation center wavelength $\lambda_0$. For example, in order for that optical signals having the respective reference wavelengths have the same x coordinate as in FIG. 5B when the waveguide refractive index $n_{eff}$ is 3.5, the diffraction order m is 1, the C band-related reference wavelength is 1530 nm, and the L band-related reference wavelength is 1590 nm, then the optical path length p may be designed to have 437.14 nm in the case of the C band and may be designed to have 454.29 nm in the case of the L band. By providing optimal optical designs to the respective wavelength bands as described above, a device handling a plurality of wavelength bands can be realized.

The grating coupler-type diffraction grating is characterized that the demultiplexing to a plane different from a plane in which a waveguide is formed is possible. This characteristic allows a plurality of grating couplers to be simultaneously formed on one optical waveguide substrate 1000 and also allows grating couplers having different designs to be simultaneously prepared as described above. Furthermore, a plurality of input/output ports can be manufactured through one process. Furthermore, optical waveguide-type WDM coupler arrays also can be simultaneously manufactured on the substrate.

A method of the integration up to the wavelength demultiplexing function on the optical waveguide substrate 1000 is not limited to the configuration of FIG. 11A. The optical waveguide substrate 1000 may be a configuration as shown in FIG. 11B in which the AWG-type diffraction grating array 1104 is used as a multi/demultiplexer on the diffraction grating array for example. As has been well known, the AWG has a configuration similar to that of the SBT circuit used in Embodiment 2 and Embodiment 3. Thus, an array waveguide as one of the circuit elements has a fixed optical path length difference between adjacent waveguides.

The AWG has a demultiplexing function as in the general diffraction grating. Thus, the input/output port as in the above-described embodiments can be structured by designing an optical waveguide so that the AWG is formed on the y-z plane to layer the resultant structure in the y axis direction. In this configuration, it is difficult to provide a circuit design over the respective AWG-type diffraction gratings layered in the y axis direction. Thus, the invention is not limited to the WDM coupler array 1103 formed on the optical waveguide substrate 1000 and also may be applied, as in the WDM coupler array 301 in Embodiment 1, to various methods such as the lattice filter circuit-type one, fiber based on the multistage Mach-Zehnder interferometer and the multilayer film filter-type one for example.

It is generally known that the relation of the formula (5) is satisfied when assuming that the AWG has the operation center wavelength $\lambda_0$, the waveguide has the refractive index $n_c$, a difference in the length between adjacent array waveguides is $\Delta L$, and the diffraction order is m.

Formula 5

$$\lambda_0 = \frac{n_c \Delta L}{m} \quad (5)$$

Specifically, the AWG has the same principle as those of a general bulk-type diffraction grating and a grating coupler-type diffraction grating. Thus, it can be understood that an optimal design can be provided to the respective C band and L band by changing the parameters as in the above-described case. Thus, the operations as in Embodiments 1 to 3 can be realized by layering the AWG-type first diffraction grating array 1104-1 having an individual design handling the C band and the AWG-type the second diffraction grating array 1104-2 having an individual design handling the L band.

This embodiment is characterized in that the diffraction grating provided on the free space in Embodiments 1 to 3 is integrated on the optical waveguide substrate 1000. When the configurations of FIG. 10A, FIG. 10B, and FIG. 11A in particular are compared with Embodiment 1, the three bulk elements of the WDM coupler array 301, the input/output port group, and the diffraction grating are realized by one substrate and do not need an alignment having 6 axis degree of freedom. The optical signal processing device using the spatial optical system requires an increased cost because an increased number of components and the accurate alignment thereof require a longer implementation time. The configuration as shown in FIG. 11A, which can reduce such an increase entirely, can realize an ultrawideband optical signal processing device that is an objective of the present invention in a very low-cost and compact manner. Furthermore, the reduced number of components also can reduce the causing factors of the misalignment causing a deteriorated characteristic, thus providing a more-reliable device.

Embodiment 5

Figure 12A:
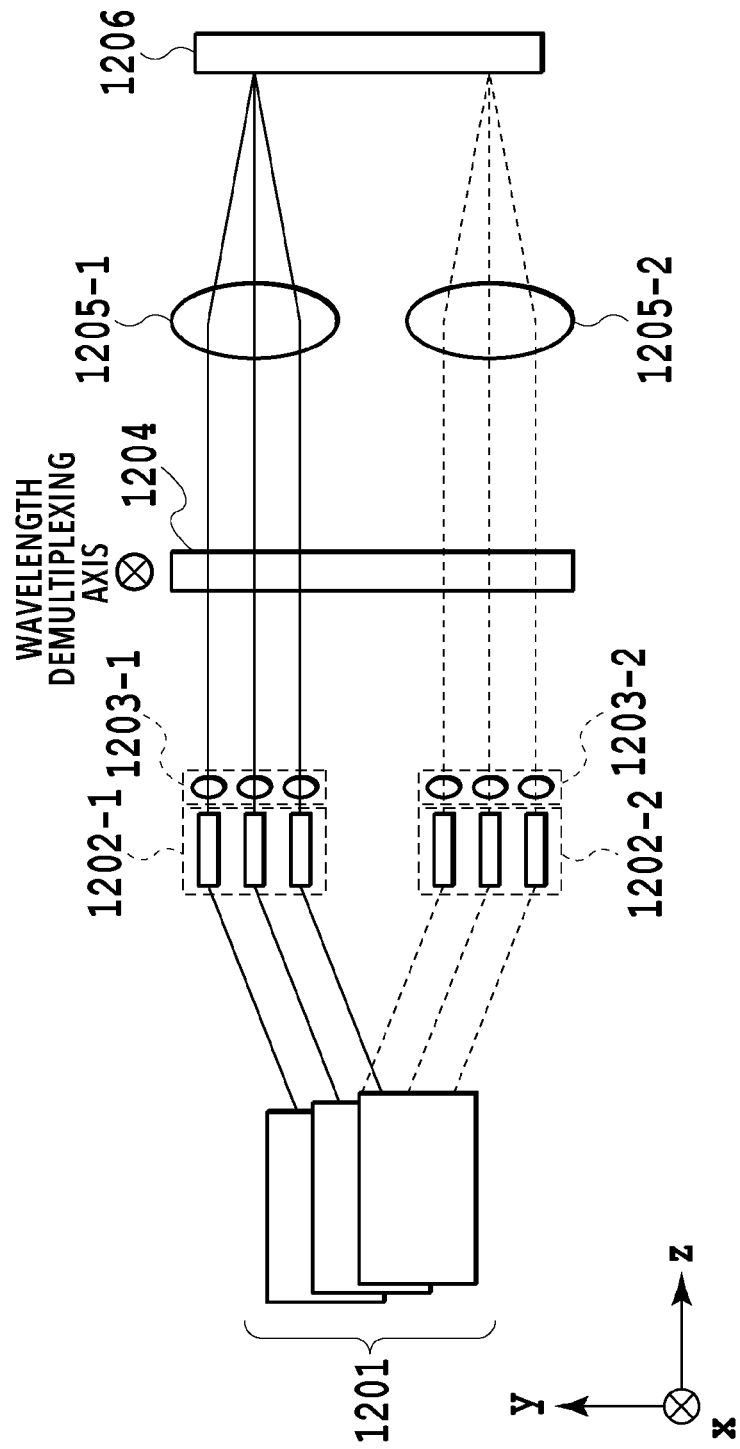
FIG. 12A illustrates the configuration of the optical signal processing device according to Embodiment 5 of the present invention seen from the x axis direction.
Figure 12B:
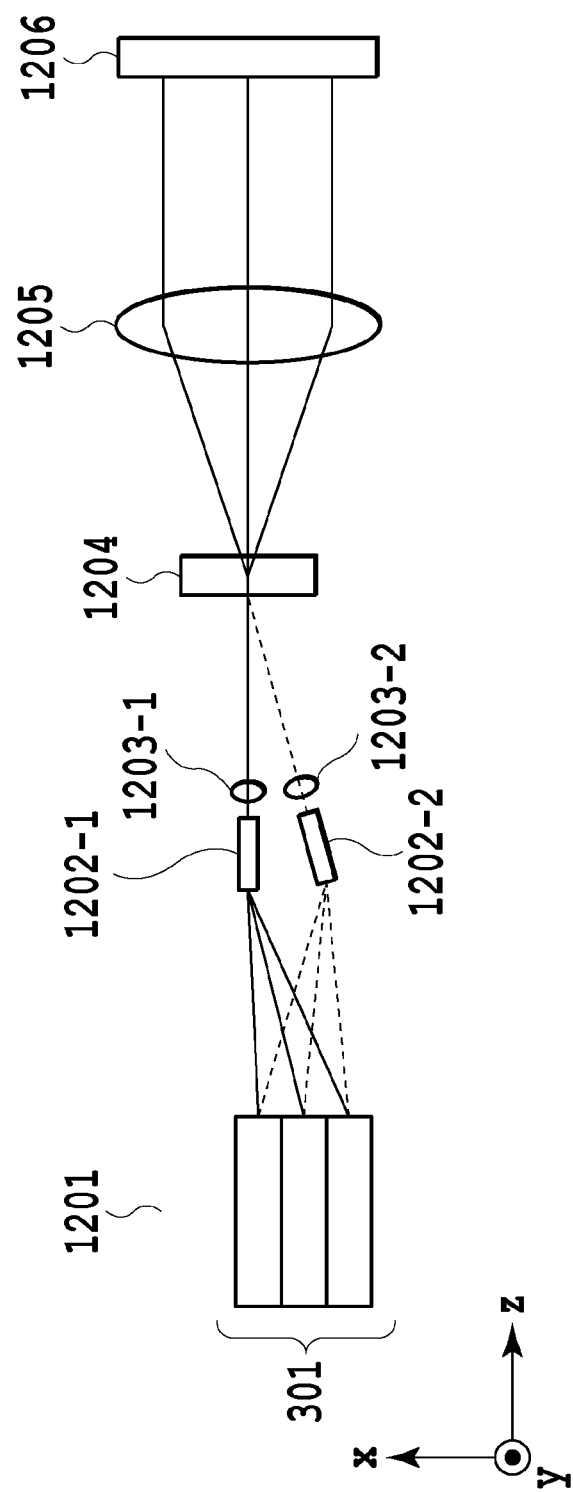
FIG. 12B illustrates the configuration of the optical signal processing device according to Embodiment 5 of the present invention seen from the y axis direction.

FIG. 12A and FIG. 12B illustrate the configuration of the optical signal processing device according to Embodiment 5 of the present invention. As shown in FIG. 12A and FIG. 12B, the optical signal processing device according to this embodiment includes a WDM coupler array 1201 including a plurality of WDM couplers for separating the C band and the L band for the respective ports, the input/output port groups 1202 provided for the C band and the L band, respectively, a micro lens array 1203, the diffraction grating 1204, a lens 1205, and a spatial light modulator 1206 arranged in this order.

The optical signal processing device according to the present invention is realized by some methods as shown in Table 1. In the description for Embodiments 1 to 4, a method has been mainly described in which diffraction gratings individually designed for the C band and the L band are provided, i.e., the L band design example (1). However, the embodiment of the present invention is not limited to the L band design example (1) as described above. In Embodiment 5 and Embodiments 6 and 7 which will be described later, a configuration will be described that realizes a wide bandwidth operation by adjusting the incidence angle caused when light enters the diffraction grating 1204 from the input/output port group 1202 for the respective C band and L band as shown in the L band design example (2).

As described above, such a design is used in which a different incidence angle is used for the C band and the L band. Thus, in this embodiment, the optical axis within the x-z plane of an optical signal passing through the first input/output port group 1202-1 and the first micro lens array 1203-1 in FIG. 12B is provided at an angle different from the angle of the optical axis within the x-z plane of an optical signal passing through the second input/output port group 1202-2 and the second micro lens array 1203-2.

In Embodiments 1 to 4, the respective wavelength bands have individual diffraction gratings. However, this embodiment is different in that a single diffraction grating 1204 is provided. Of course, some optical designs may change, as in this embodiment, the angle of light entering the diffraction gratings at the C band and the L band to subsequently design the diffraction gratings independently.

This embodiment is more effective in the cost reduction when compared with Embodiment 1. Specifically, by changing the angles at which the respective input/output ports are provided, this embodiment requires only one diffraction grating. A diffraction grating is a component requiring the highest cost among those of optical components. Thus, the diffraction grating-related CAPEX can be approximately halved.

Figure 13:
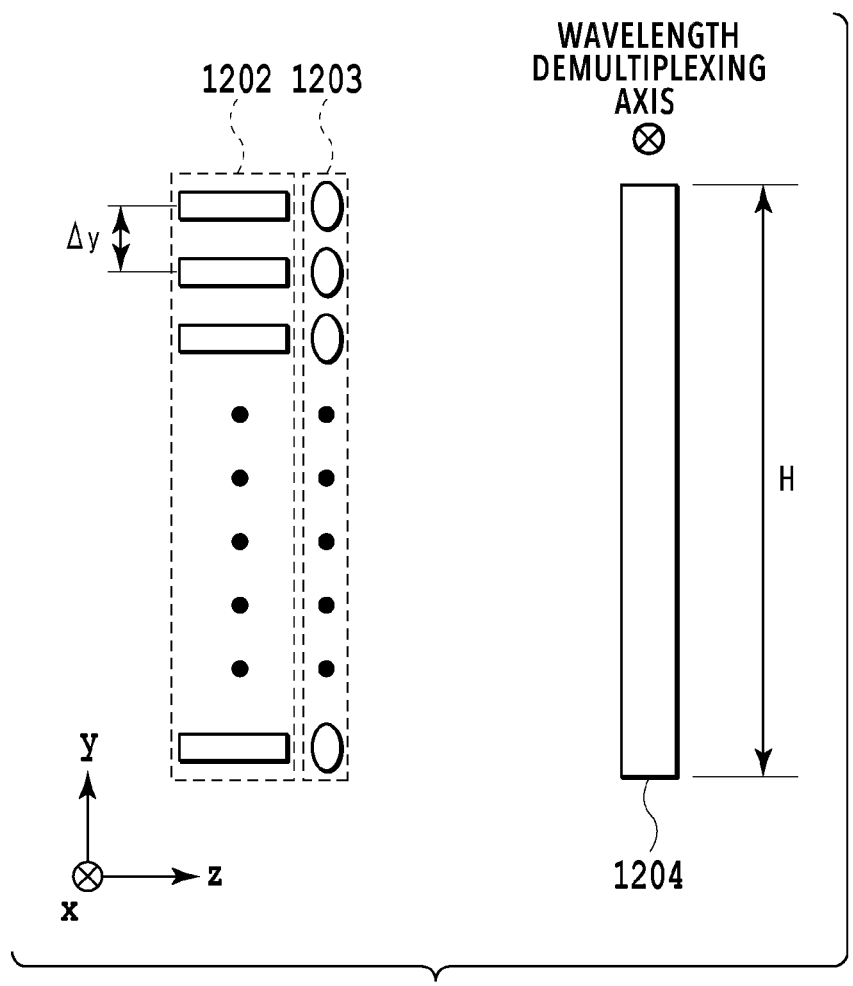
FIG. 13 illustrates the relation between the opening height H of a diffraction grating 1204 of the optical signal processing device according to Embodiment 5 of the present invention and the inter-port distance of an input/output port group 1202 with regard to the y axis direction.

FIG. 13 shows the relation between the opening height H of the diffraction grating 1204 of the optical signal processing device according to Embodiment 5 of the present invention and the inter-port distance of the input/output port group 1202 in the y axis direction. As shown in FIG. 13, when assuming that the diffraction grating 1204 has the opening height H in the y axis direction and the input/output port group 1202 has the inter-port distance $\Delta y$ in the y axis direction, then the maximum port number $P_{max}$ that can be designed is represented by the following formula.

Formula 6

$$P_{max} = \frac{H}{\Delta y} \qquad (6)$$

The inter-port distance $\Delta y$ is significantly limited by external factors such as the setting of the crosstalk amount between ports or the fiber thickness. Thus, an item that can be freely designed is the opening height H of the diffraction grating only. Thus, the maximum port number $P_{max}$ that can be designed depends on H. In Embodiments 1 to 4, diffraction gratings must be individually provided in the y axis direction for the respective C band and L band and also requires a case where a margin between the diffraction gratings must be considered due to the reasons of the implementation or the manufacture of the diffraction gratings.

On the other hand, this embodiment requires only a single diffraction grating 1204. Thus, the opening height H, when being combined with the same height in the y axis direction as those of Embodiments 1 to 4, can be doubled compared with those of Embodiments 1 to 4. In addition, the margin between the diffraction gratings does not have to be considered, thus achieving the maximum port number $P_{max}$ that is two or more times higher than those of Embodiments 1 to 4.

Embodiment 6

Figure 14A:
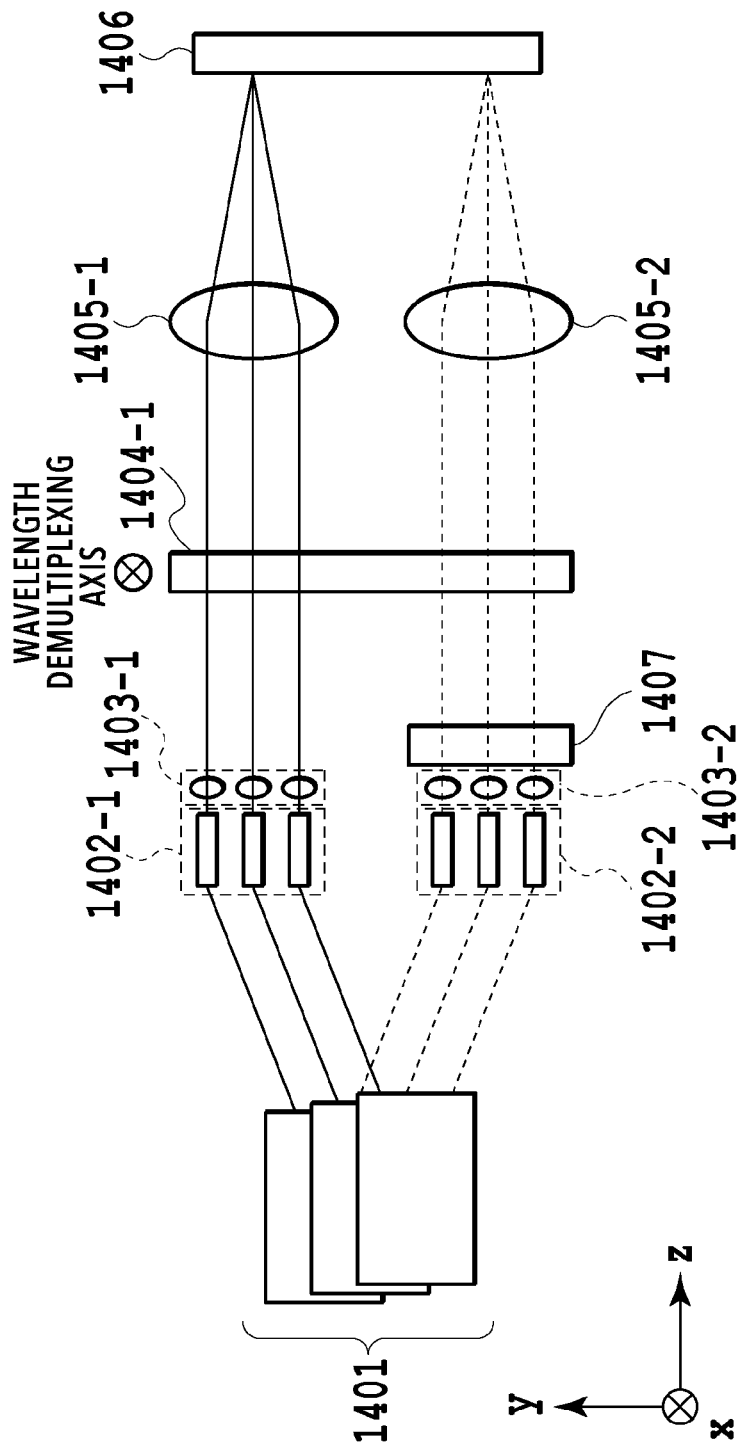
FIG. 14A illustrates the configuration of the optical signal processing device according to Embodiment 6 of the present invention seen from the x axis direction.
Figure 14B:
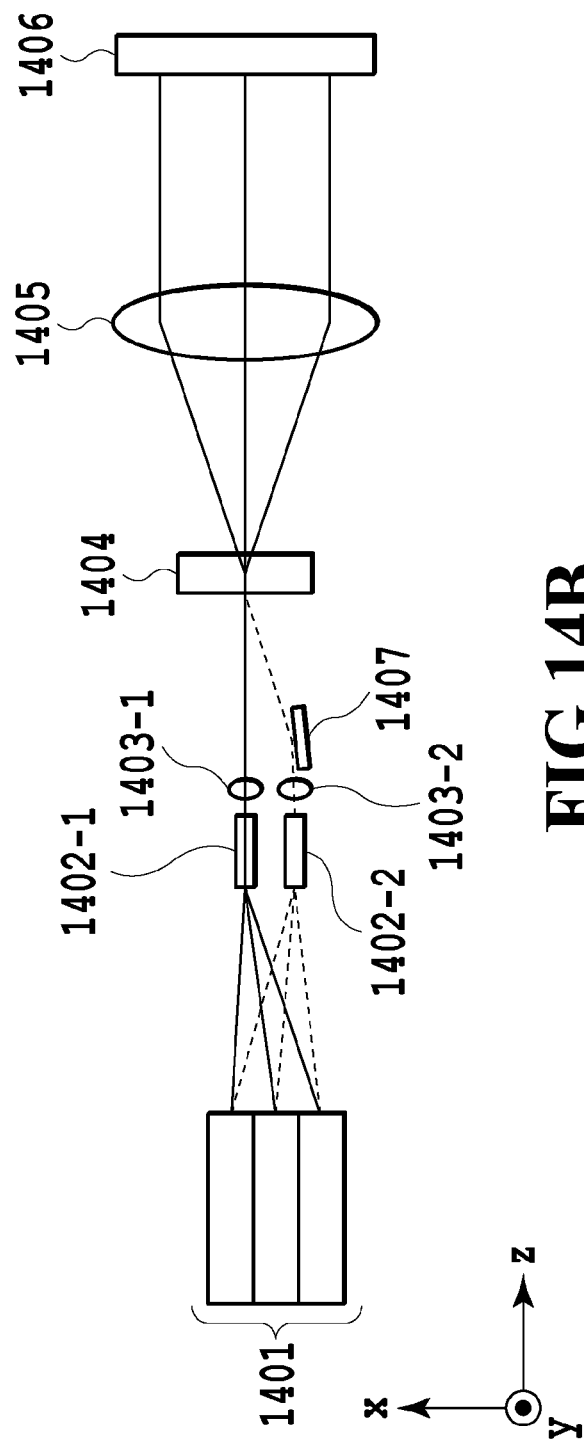
FIG. 14B illustrates the configuration of the optical signal processing device according to Embodiment 6 of the present invention seen from the y axis direction.

FIG. 14A and FIG. 14B illustrate the configuration of the optical signal processing device according to Embodiment 6 of the present invention.

As shown in FIG. 14A and FIG. 14B, the optical signal processing device according to this embodiment includes a WDM coupler array 1401 including a plurality of WDM couplers for separating the C band and the L band for the respective ports, input/output port groups 1402 provided for the C band and the L band, respectively, a micro lens array 1403, a diffraction grating 1404, a lens 1405, and a spatial light modulator 1406 arranged in this order. The optical signal processing device according to this embodiment further includes an angle adjustment mechanism 1407. The angle adjustment mechanism 1407 is a configuration not provided in Embodiment 5 and is provided between the second micro lens array 1403-2 and the diffraction grating 1404.

With reference to the L band design (2) of Table 1, the first input/output port group 1402-1 and the diffraction grating 1404 forms an angle of 45° within the x-z plane. The second input/output port group 1402-2 and the diffraction grating 1404 forms an angle of 50.09°. The difference between these angles is 5.09°. Thus, in Embodiment 5, the angle of the second input/output port group 1202-2 and the second micro lens array 1203-2 is adjusted. However, the first and second input/output port groups 1402-1 and 1402-2 can be arranged to be parallel to each other to thereby reduce the load in the manufacture or the implementation. For example, it has been general that the input/output port group having an increased port number or function is obtained by polishing and bonding a plurality of input/output port groups in a fiber array or a planer light wave circuit (Planar Lightwave Circuit, PLC) for example. Furthermore, many PLCs having a larger size have been reported that are manufactured by forming an optical circuit to have a plurality of layer structures.

As described above, a plurality of input/output port arranged to be parallel to each other is advantageous in the implementation. Thus, the first input/output port group 1402-1 and the second input/output port group 1402-2 are arranged to be parallel to each other within the x-z plane. In addition, optical signals emitted from the first input/output port group 1402-1 and the second input/output port group 1402-2 are allowed to enter the diffraction grating 1404 at a desired angle difference by the adjustment by the angle adjustment mechanism 1407 provided between the second micro lens array 1403-2 and the diffraction grating 1404. This is a main characteristic of this embodiment.

In FIG. 14B, the angle adjustment mechanism 1407 is exemplarily illustrated as having a mirror to change only the optical axis of an optical signal emitted from the second input/output port group 1402-2. However, the angle adjustment mechanism 1407 is not limited to a mirror so long as the optical signal can enter the diffraction grating 1404 at a desired angle. For example, the angle adjustment mechanism 1407 may use the deflection using a refraction phenomenon by a prism for example or also may be the deflection in the emission direction by processing the input/output port group 1402 itself.

The angle adjustment mechanism 1407 may be provided only at the second input/output port group 1402-2 or also may be provided at the optical axis side for the first input/output port group 1402-1 or also may be provided at both of the groups.

FIG. 15A to FIG. 15D illustrate the combination and structure of the input/output port group 1501, the micro lens array 1502, and the angle adjustment mechanisms 1503 to 1506 according to Embodiment 5 of the present invention. FIG. 15A to FIG. 15D show a configuration example from the input/output port group 1402 to the entrance to the diffraction grating 1404 shown in FIG. 14A and FIG. 14B.

Figure 15A:
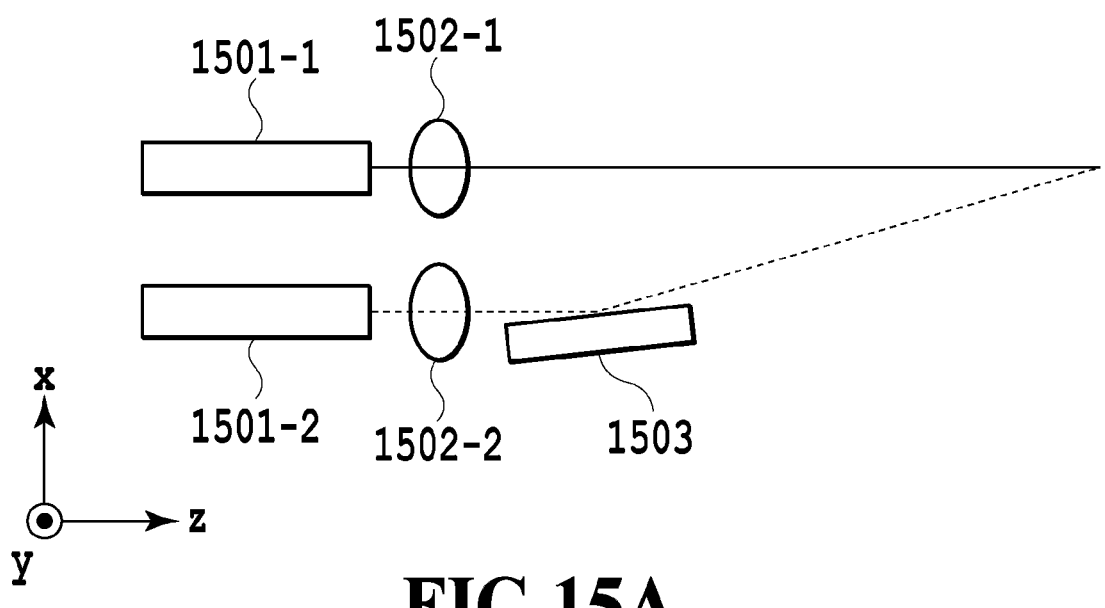
FIG. 15A illustrates the configuration and structure of an input/output port group 1501, a micro lens array 1502, and angle adjustment mechanisms 1503 to 1506 according to Embodiment 5 of the present invention.

The configuration shown in FIG. 15A corresponds to the configuration shown in FIG. 14B. Thus, among the first input/output port group 1501-1 and the second input/output port group 1501-2, only the signal light emitted from the second input/output port group 1501-2 is deflected by a mirror functioning as the angle adjustment mechanism 1503. This configuration utilizes the total reflection and thus is advantageous in that a large angle difference caused when signal light of the respective wavelength bands enter the diffraction grating can be easily handled.

Figure 15B:
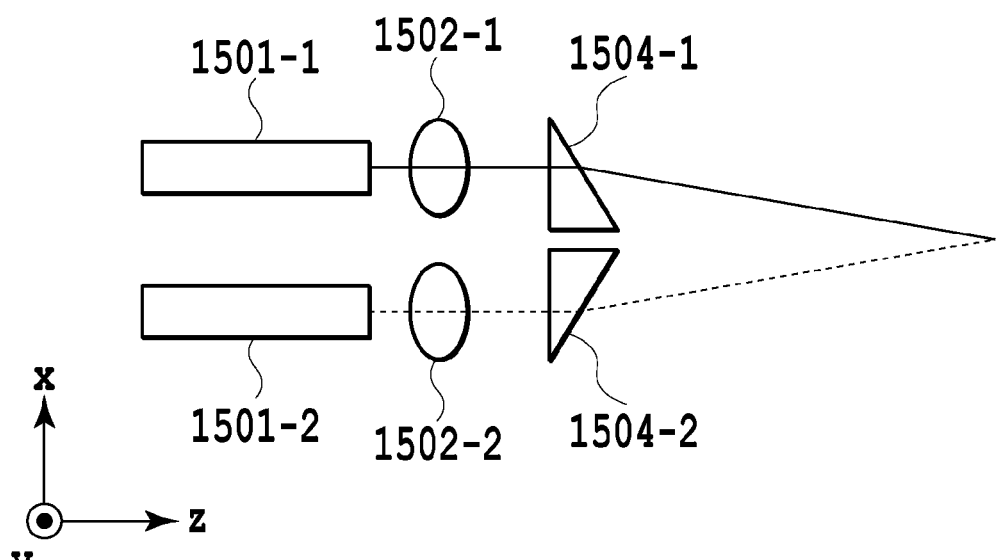
FIG. 15B illustrates the configuration and structure of the input/output port group 1501, the micro lens array 1502, and the angle adjustment mechanisms 1503 to 1506 according to Embodiment 5 of the present invention.

The configuration shown in FIG. 15B is an example in which the angle adjustment mechanism 1503 composed of a mirror is substituted with an angle adjustment mechanism 1504 composed of a prism. The angle adjustment mechanism 1503 composed of a mirror must be provided at a position and an angle that prevent the interference with signals of the respective wavelength bands. In contrast with this, the prism can be provided in a relatively-narrow region because the prism can be provided so that the optical axis of signal light can pass through the interior of the prism.

In FIG. 15B, a plurality of prisms are provided so as to be able to adjust the angles of signal lights for the respective wavelength bands. However, it is not always required to provide prisms for all signal lights. Any prisms may be provided in any number so long as a desired incidence angle can be achieved.

Figure 15C:
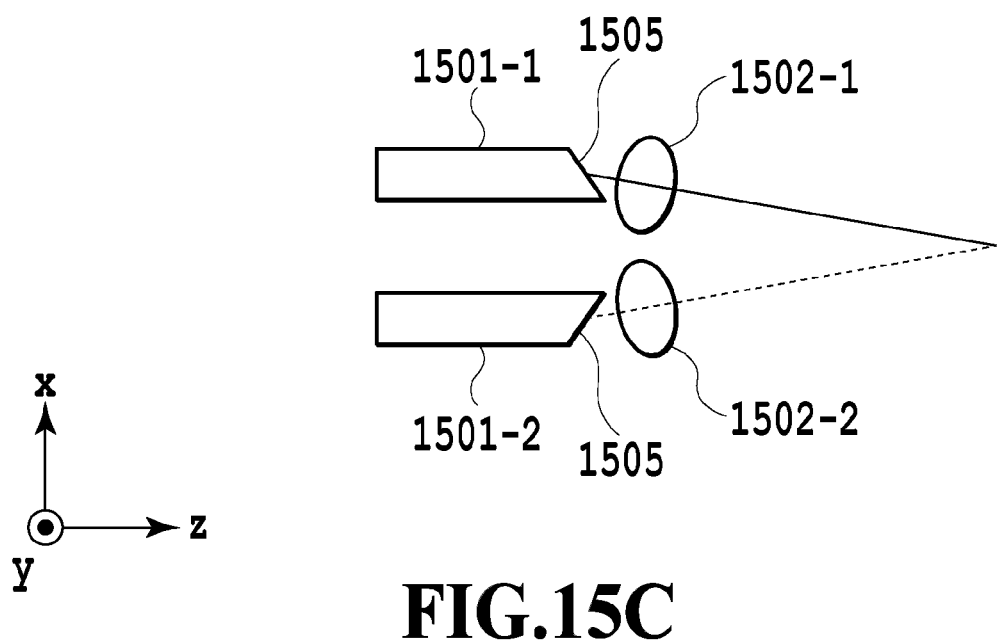
FIG. 15C illustrates the configuration and structure of the input/output port group 1501, the micro lens array 1502, and the angle adjustment mechanisms 1503 to 1506 according to Embodiment 5 of the present invention.

The configuration shown in FIG. 15C is an example in which each emission end of an input/output port 1501 has an angle adjustment mechanism 1505 functioning as an oblique polishing unit processed to be oblique within the x-z plane to thereby control the emission angle itself from the input/output port 1501. This configuration uses a principle similar to that of the angle adjustment mechanism 1504 of the prism in FIG. 15B. This configuration provides a device requiring a lower cost because this configuration eliminates, by a processed end face of the input/output port 1501, the need for an addition of a prism for example and also eliminates the implementation of the alignment.

Figure 15D:
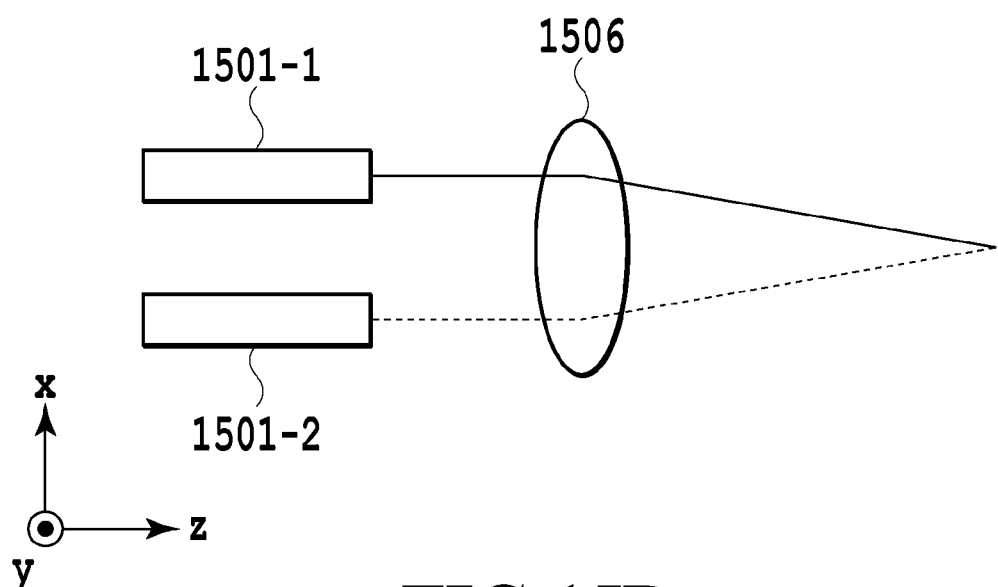
FIG. 15D illustrates the configuration and structure of the input/output port group 1501, the micro lens array 1502, and the angle adjustment mechanisms 1503 to 1506 according to Embodiment 5 of the present invention.

The configuration shown in FIG. 15D omits the micro lens array 1502 used in the configurations shown in FIG. 15A to FIG. 15C and provides an angle adjustment mechanism 1506 functioning as an angle adjustment lens to thereby control the incidence angle to the diffraction grating. Generally, a lens is a Fourier transformation device and thus the refraction angle after the lens transmission changes depending on the offset amount from the lens optical axis of the optical signal having entered the lens. In this case, the function of the micro lens array 1502 to collimate the light emitted from each input/output port group 1501 into a space is also provided by the angle adjustment mechanism 1506 functioning as an angle adjustment lens. Thus, only the input/output port group 1501 and the angle adjustment mechanism 1506 functioning as an angle adjustment lens can provide the collimation and angle adjustment, thus providing both of a lower cost and a reduced alignment difficulty.

As shown in the above typical example, the incidence angle from each input/output port group 1401 to the diffraction grating 1404 can be freely controlled by arranging an input/output port group 1401, a micro lens array 1402, and the angle adjustment mechanism 1407 of FIG. 14A and FIG. 14B.

Of course, a mechanism for controlling the incidence angle to the diffraction grating is not limited to those shown in FIG. 15A to FIG. 15D. Thus, a configuration obtaining by combining a plurality of mechanisms or a totally-different configuration also may be used.

In the description for this embodiment, an angle adjustment lens as one lens is used as the angle adjustment mechanism 1506 for example in FIG. 15D. However, any configuration having any number of lenses may be used so long as the configuration achieves a similar optical characteristic. Some optical designs also may use a combination with the micro lens array 1502.

Embodiment 7

Figure 16A:
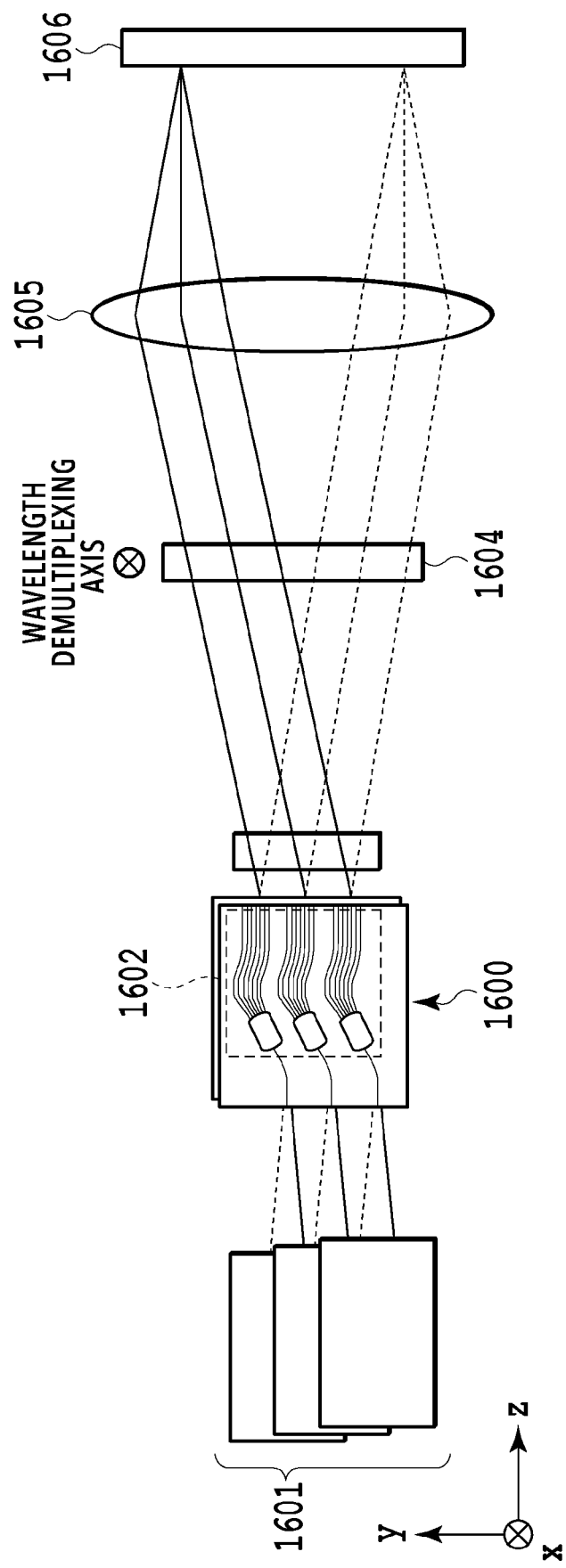
FIG. 16A illustrates the configuration of the optical signal processing device according to Embodiment 7 of the present invention seen from the x axis direction.
Figure 16B:
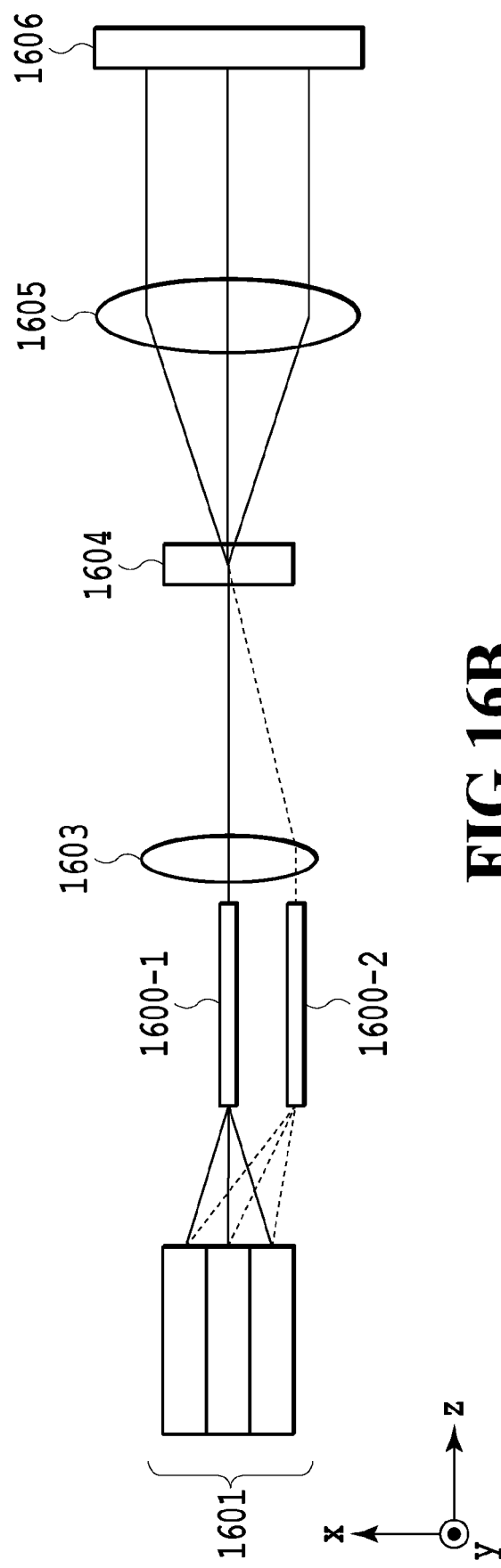
FIG. 16B illustrates the configuration of the optical signal processing device according to Embodiment 7 of the present invention seen from the y axis direction.

FIG. 16A and FIG. 16B illustrate the configuration of the optical signal processing device according to Embodiment 7 of the present invention.

As shown in FIG. 16A and FIG. 16B, the optical signal processing device according to this embodiment includes a WDM coupler array 1601 including a plurality of WDM couplers to separate the C band and the L band for the respective ports, an optical waveguide substrate 1600 including input/output port groups 1602 provided for the C band and the L band, respectively, an angle adjustment lens 1603, a diffraction grating 1604, a lens 1605, and a spatial light modulator 1606 arranged in this order. In this embodiment, the optical signals of the C band and L band wavelength bands separated from the WDM coupler array 1601 are independently transmitted to the first optical waveguide substrate 1600-1 and the second the optical waveguide substrate 1600-2, respectively and are further connected to the SBTs formed in the first optical waveguide substrate 1600-1 and the second the optical waveguide substrate 1600-2, respectively. This allows, as in Embodiment 3, the optical signals emitted from the optical waveguide substrate 1600 into a free space are emitted within the y-z plane at different angles for the C band and the L band. Thus, the lens 1605 has the angle adjustment lens 1603 common to the respective optical signals of the C band and the L band.

This embodiment is characterized in that, as described in Embodiment 3, the respective optical signals for the C band and the L band are emitted within the y-z plane from the optical waveguide substrate 1600 to the space with different emission angles. This embodiment is also characterized in that, as described in Embodiment 5 and Embodiment 6, the optical signals for the C band and the L band are allowed to enter the diffraction grating 1604 within the x-z plane. A micro lens 1203 and a lens group 1205 required in an amount corresponding to the number of the number of wavelength bands used in Embodiment 6 can be substituted with the angle adjustment lens 1603 and the lens 1605, respectively. Thus, such a configuration can be obtained that significantly contribute to a further simpler implementation and an optical signal processing device having a lower cost.

REFERENCE SIGNS LIST

101 Optical amplitude amplification function part group
102 Wavelength selection function part group
103 Wavelength demultiplexing function part group
104 Receiver group
105 Transmitter group
106 Wavelength multiplexing function part group
107 Wavelength selection function part group
108 Optical amplitude amplification function part group
201 Wavelength band demultiplexing function part
202 C band ROADM node
203 L band ROADM node
204 Wavelength band multiplexing function part
301, 601, 901, and 1001 WDM coupler array
302, 602, and 902 Input/output port group
303, 603, 903, and 1003 Micro lens array
304, 604, and 904 Diffraction grating
305, 605, and 904 Lens
306, 606, and 906 Spatial light modulator
600, 900, and 1000 Optical waveguide substrate
701 Linear waveguide
702 Slab waveguide
703 Tapered structure waveguide
704 Lens function part
705 First slab waveguide
706 Array waveguide
707 Second slab waveguide
801 First input/output waveguide
802 Second input/output waveguide
803 Slab waveguide
804 Array waveguide 1101 and 1103 WDM coupler array
1102 Grating coupler-type diffraction grating array
1104 AWG-type diffraction grating array
1201, 1401, and 1601 WDM coupler array
1202, 1402, 1501, and 1602 Input/output port group
1203, 1403, and 1502 Micro lens array
1204, 1404, and 1604 Diffraction grating
1205, 1405, and 1605 Lens
1206, 1406, and 1606 Spatial light modulator
1407 and 1503-1506 Angle adjustment mechanism

The invention claimed is:

1. An optical signal processing device, comprising:
M, M≥1, wavelength band separation means for separating optical signals for N, N≥2, wavelength bands having no mutually-overlapping wavelength ranges to output the optical signals for the respective wavelength bands, respectively;
a wavelength demultiplexing means for providing the optical signals for the respective wavelength bands separated by the M wavelength band separation means with different wavelength demultiplexing statuses in a free space, respectively;
a light collecting means for light-collecting the wavelength-demultiplexed optical signal for each of the wavelength bands; and
one spatial light modulator for phase-modulating the optical signals light-collected in N regions by the light collecting means, respectively,
wherein: among the optical signals light-collected in the N regions for the respective wavelength bands, two or more optical signals having a reference wavelength of the wavelength band have the same light collecting position at the wavelength demultiplexing axis of the wavelength demultiplexing means.

2. The optical signal processing device according to claim 1, further comprising at least M input/output port groups inserted between the wavelength band separation means and the wavelength demultiplexing means, wherein the input/output port group is connected to the wavelength demultiplexing means via a free space.

3. The optical signal processing device according to claim 1, wherein: the wavelength demultiplexing means is a bulk diffraction grating.

4. The optical signal processing device according to claim 3, wherein: an incidence angle of the optical signal to the bulk diffraction grating is different depending on the wavelength band to be wavelength-demultiplexed.

5. The optical signal processing device according to claim 3, wherein: the wavelength demultiplexing means includes at least N the bulk diffraction gratings and an optical signal different for each of the wavelength bands enters the bulk diffraction grating.

6. The optical signal processing device according to claim 5, wherein: the groove number of the bulk diffraction gratings is different depending on the wavelength band to be wavelength-demultiplexed.

7. The optical signal processing device according to claim 3, wherein:
the wavelength demultiplexing means is one bulk diffraction grating and includes an angle adjustment means that deflects, within a wavelength demultiplexed surface by the wavelength demultiplexing means, at least one travelling direction of optical signals for the respective wavelength bands incident on the wavelength demultiplexing means.

8. The optical signal processing device according to claim 7, wherein: the angle adjustment means is a lens receiving at least two or more optical signals of optical signals for the respective wavelength bands and the travelling directions of optical signals for the respective wavelength bands having entered the wavelength demultiplexing means through the lens is different within the wavelength demultiplexed surface.

9. The optical signal processing device according to claim 1, wherein: the wavelength demultiplexing means is formed on a planar optical circuit substrate.

10. The optical signal processing device according to claim 9, wherein: the wavelength demultiplexing means includes a plurality of wavelength demultiplexing means using multiple-beam interference corresponding to the wavelength band to be wavelength-demultiplexed and the plurality of wavelength demultiplexing means using the multiple-beam interference have at least one of an effective refractive index, an optical path length difference, a diffraction order, and an emission angle mutually different depending on the wavelength band to be wavelength-demultiplexed.

11. The optical signal processing device according to claim 1, wherein: the wavelength band separation means is formed on a planar optical circuit substrate.

* * * * *